United States Patent
Yeung et al.

(10) Patent No.: US 12,092,100 B2
(45) Date of Patent: *Sep. 17, 2024

(54) SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP

(71) Applicant: BJ Energy Solutions, LLC, Houston, TX (US)

(72) Inventors: Tony Yeung, Houston, TX (US); Ricardo Rodriguez-Ramon, Houston, TX (US); Guillermo Rodriguez, Houston, TX (US); Samir Nath Seth, Houston, TX (US)

(73) Assignee: BJ Energy Solutions, LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,821

(22) Filed: Feb. 13, 2023

(65) Prior Publication Data
US 2023/0193897 A1    Jun. 22, 2023

Related U.S. Application Data

(63) Continuation of application No. 17/585,766, filed on Jan. 27, 2022, now Pat. No. 11,719,234, which is a
(Continued)

(51) Int. Cl.
*F04B 53/00* (2006.01)
*F04B 17/00* (2006.01)
(Continued)

(52) U.S. Cl.
CPC ............ *F04B 53/003* (2013.01); *F04B 17/00* (2013.01); *F16F 15/1202* (2013.01); *F16F 15/1457* (2013.01); *F16F 15/3153* (2013.01)

(58) Field of Classification Search
CPC . F04B 53/003; F04B 15/1457; F04B 15/3153
See application file for complete search history.

(56) References Cited

U.S. PATENT DOCUMENTS 2,498,229 A    2/1950   Adler
2,535,703 A   12/1950   Smith et al.
(Continued)

FOREIGN PATENT DOCUMENTS

AU    9609498    7/1999
AU     737970    9/2001
(Continued)

OTHER PUBLICATIONS

Europump and Hydrualic Institute, Variable Speed Pumping: A Guide to Successful Applications, Elsevier Ltd, 2004.
(Continued)

*Primary Examiner* — Thomas C Diaz
(74) *Attorney, Agent, or Firm* — Norton Rose Fulbright US LLP

(57) ABSTRACT

A pump system may include a pump, a driveshaft, driving equipment, and a vibration dampening assembly configured to reduce pump-imposed high frequency/low amplitude and low frequency/high amplitude torsional vibrations. The pump may have an input shaft connected to the driveshaft. The driving equipment may include an output shaft having an output flange connected to the driveshaft. The driving equipment may be configured to rotate the driveshaft to rotate the input shaft of the pump therewith. The vibration dampening assembly may include one or more flywheels operably connected to the input shaft and configured to rotate therewith.

16 Claims, 9 Drawing Sheets

Related U.S. Application Data continuation of application No. 17/469,970, filed on Sep. 9, 2021, now Pat. No. 11,280,331, which is a continuation of application No. 17/363,151, filed on Jun. 30, 2021, now Pat. No. 11,149,726, which is a continuation of application No. 17/213,562, filed on Mar. 26, 2021, now Pat. No. 11,092,152, which is a continuation of application No. 16/948,291, filed on Sep. 11, 2020, now Pat. No. 11,015,594.

(60) Provisional application No. 62/704,560, filed on May 15, 2020, provisional application No. 62/899,963, filed on Sep. 13, 2019.

(51) Int. Cl.
*F16F 15/12* (2006.01)
*F16F 15/14* (2006.01)
*F16F 15/315* (2006.01)

(56) References Cited

U.S. PATENT DOCUMENTS

| | | | |
|---|---|---|---|
| 2,820,341 A | 1/1958 | Amann | |
| 2,868,004 A | 1/1959 | Runde | |
| 2,940,377 A | 6/1960 | Darnell et al. | |
| 2,947,141 A | 8/1960 | Russ | |
| 3,068,796 A | 12/1962 | Pfluger et al. | |
| 3,191,517 A | 6/1965 | Solzman | |
| 3,257,031 A | 6/1966 | Dietz | |
| 3,274,768 A | 9/1966 | Klein | |
| 3,378,074 A | 4/1968 | Kiel | |
| 3,382,671 A | 5/1968 | Ehni, III | |
| 3,463,612 A | 8/1969 | Whitsel | |
| 3,550,696 A | 12/1970 | Kenneday | |
| 3,560,053 A | 2/1971 | Ortloff | |
| 3,586,459 A | 6/1971 | Zerlauth | |
| 3,632,222 A | 1/1972 | Cronstedt | |
| 3,656,582 A | 4/1972 | Alcock | |
| 3,739,872 A | 6/1973 | McNair | |
| 3,759,063 A | 9/1973 | Bendall | |
| 3,765,173 A | 10/1973 | Harris | |
| 3,771,916 A | 11/1973 | Flanigan et al. | |
| 3,773,438 A | 11/1973 | Hall et al. | |
| 3,781,135 A | 12/1973 | Nickell | |
| 3,786,835 A | 1/1974 | Finger | |
| 3,791,682 A | 2/1974 | Mitchell | |
| 3,796,045 A | 3/1974 | Foster | |
| 3,814,549 A | 6/1974 | Cronstedt | |
| 3,820,922 A | 6/1974 | Buse et al. | |
| 3,963,372 A | 6/1976 | McLain et al. | |
| 4,010,613 A | 3/1977 | McInerney | |
| 4,019,477 A | 4/1977 | Overton | |
| 4,031,407 A | 6/1977 | Reed | |
| 4,059,045 A | 11/1977 | McClain | |
| 4,086,976 A | 5/1978 | Holm et al. | |
| 4,117,342 A | 9/1978 | Melley, Jr. | |
| 4,173,121 A | 11/1979 | Yu | |
| 4,204,808 A | 5/1980 | Reese et al. | |
| 4,209,079 A | 6/1980 | Marchal et al. | |
| 4,209,979 A | 7/1980 | Woodhouse et al. | |
| 4,222,229 A | 9/1980 | Uram | |
| 4,239,396 A | 12/1980 | Arribau et al. | |
| 4,269,569 A | 5/1981 | Hoover | |
| 4,311,395 A | 1/1982 | Douthitt et al. | |
| 4,330,237 A | 5/1982 | Battah | |
| 4,341,508 A | 7/1982 | Rambin, Jr. | |
| 4,357,027 A | 11/1982 | Zeitlow | |
| 4,383,478 A | 5/1983 | Jones | |
| 4,402,504 A | 9/1983 | Christian | |
| 4,457,325 A | 7/1984 | Green | |
| 4,470,771 A | 9/1984 | Hall et al. | |
| 4,483,684 A * | 11/1984 | Black | F16F 15/12313 192/214.1 |
| 4,505,650 A | 3/1985 | Hannett et al. | |
| 4,574,880 A | 3/1986 | Handke | |
| 4,584,654 A | 4/1986 | Crane | |
| 4,672,813 A | 6/1987 | David | |
| 4,754,607 A | 7/1988 | Mackay | |
| 4,782,244 A | 11/1988 | Wakimoto | |
| 4,796,777 A | 1/1989 | Keller | |
| 4,869,209 A | 9/1989 | Young | |
| 4,913,625 A | 4/1990 | Gerlowski | |
| 4,983,259 A | 1/1991 | Duncan | |
| 4,990,058 A | 2/1991 | Eslinger | |
| 5,135,361 A | 8/1992 | Dion | |
| 5,245,970 A | 9/1993 | Iwaszkiewicz et al. | |
| 5,291,842 A | 3/1994 | Sallstrom et al. | |
| 5,362,219 A | 11/1994 | Paul et al. | |
| 5,537,813 A | 7/1996 | Davis et al. | |
| 5,553,514 A * | 9/1996 | Walkowc | F16F 15/10 74/574.2 |
| 5,560,195 A | 10/1996 | Anderson et al. | |
| 5,586,444 A | 12/1996 | Fung | |
| 5,622,245 A | 4/1997 | Reik | |
| 5,626,103 A | 5/1997 | Haws et al. | |
| 5,651,400 A | 7/1997 | Corts et al. | |
| 5,678,460 A | 10/1997 | Walkowc | |
| 5,717,172 A | 2/1998 | Griffin, Jr. et al. | |
| 5,720,598 A | 2/1998 | de Chizzelle | |
| 5,839,888 A | 11/1998 | Harrison | |
| 5,846,062 A | 12/1998 | Yanagisawa et al. | |
| 5,983,962 A | 11/1999 | Gerardot | |
| 6,041,856 A | 3/2000 | Thrasher et al. | |
| 6,050,080 A | 4/2000 | Horner | |
| 6,067,962 A | 5/2000 | Bartley et al. | |
| 6,071,188 A | 6/2000 | O'Neill et al. | |
| 6,074,170 A | 6/2000 | Bert et al. | |
| 6,123,751 A | 9/2000 | Nelson et al. | |
| 6,129,335 A | 10/2000 | Yokogi | |
| 6,145,318 A | 11/2000 | Kaplan et al. | |
| 6,230,481 B1 | 5/2001 | Jahr | |
| 6,279,309 B1 | 8/2001 | Lawlor, II et al. | |
| 6,321,860 B1 | 11/2001 | Reddoch | |
| 6,334,746 B1 | 1/2002 | Nguyen et al. | |
| 6,530,224 B1 | 3/2003 | Conchieri | |
| 6,543,395 B2 | 4/2003 | Green | |
| 6,655,922 B1 | 12/2003 | Flek | |
| 6,765,304 B2 | 7/2004 | Baten et al. | |
| 6,786,051 B2 | 9/2004 | Kristich et al. | |
| 6,851,514 B2 | 2/2005 | Han et al. | |
| 6,859,740 B2 | 2/2005 | Stephenson et al. | |
| 6,901,735 B2 | 6/2005 | Lohn | |
| 6,962,057 B2 | 11/2005 | Kurokawa et al. | |
| 7,007,966 B2 | 3/2006 | Campion | |
| 7,047,747 B2 | 5/2006 | Tanaka | |
| 7,065,953 B1 | 6/2006 | Kopko | |
| 7,143,016 B1 | 11/2006 | Discenzo et al. | |
| 7,222,015 B2 | 5/2007 | Davis et al. | |
| 7,388,303 B2 | 6/2008 | Seiver | |
| 7,404,294 B2 | 7/2008 | Sundin | |
| 7,442,239 B2 | 10/2008 | Armstrong et al. | |
| 7,545,130 B2 | 6/2009 | Latham | |
| 7,552,903 B2 | 6/2009 | Dunn et al. | |
| 7,563,076 B2 | 7/2009 | Brunet et al. | |
| 7,563,413 B2 | 7/2009 | Naets et al. | |
| 7,574,325 B2 | 8/2009 | Dykstra | |
| 7,581,379 B2 | 9/2009 | Yoshida et al. | |
| 7,594,424 B2 | 9/2009 | Fazekas | |
| 7,614,239 B2 | 11/2009 | Herzog et al. | |
| 7,627,416 B2 | 12/2009 | Batenburg et al. | |
| 7,677,316 B2 | 3/2010 | Butler et al. | |
| 7,721,521 B2 | 5/2010 | Kunkle et al. | |
| 7,730,711 B2 | 6/2010 | Kunkle et al. | |
| 7,779,961 B2 | 8/2010 | Matte | |
| 7,789,452 B2 | 9/2010 | Dempsey et al. | |
| 7,836,949 B2 | 11/2010 | Dykstra | |
| 7,841,394 B2 | 11/2010 | McNeel et al. | |
| 7,845,413 B2 | 12/2010 | Shampine et al. | |
| 7,886,702 B2 | 2/2011 | Jerrell et al. | |
| 7,900,724 B2 | 3/2011 | Promersberger et al. | |
| 7,921,914 B2 | 4/2011 | Bruins et al. | |
| 7,938,151 B2 | 5/2011 | Höckner | |
| 7,980,357 B2 | 7/2011 | Edwards | |

(56) References Cited

U.S. PATENT DOCUMENTS

| | | |
|---|---|---|
| 8,056,635 B2 | 11/2011 | Shampine et al. |
| 8,083,504 B2 | 12/2011 | Williams et al. |
| 8,186,334 B2 | 5/2012 | Ooyama |
| 8,196,555 B2 | 6/2012 | Keda et al. |
| 8,202,354 B2 | 6/2012 | Iijima |
| 8,316,936 B2 | 11/2012 | Roddy et al. |
| 8,336,631 B2 | 12/2012 | Shampine et al. |
| 8,414,673 B2 | 4/2013 | Raje et al. |
| 8,469,826 B2 | 6/2013 | Brosowske |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,656,990 B2 | 2/2014 | Kajaria et al. |
| 8,672,606 B2 | 3/2014 | Glynn et al. |
| 8,707,853 B1 | 4/2014 | Dille et al. |
| 8,708,667 B2 | 4/2014 | Collingborn |
| 8,714,253 B2 | 5/2014 | Sherwood et al. |
| 8,757,918 B2 | 6/2014 | Ramnarain et al. |
| 8,770,329 B2 | 7/2014 | Spitler |
| 8,784,081 B1 | 7/2014 | Blume |
| 8,789,601 B2 | 7/2014 | Broussard et al. |
| 8,794,307 B2 | 8/2014 | Coquilleau et al. |
| 8,801,394 B2 | 8/2014 | Anderson |
| 8,851,186 B2 | 10/2014 | Shampine et al. |
| 8,851,441 B2 | 10/2014 | Acuna et al. |
| 8,894,356 B2 | 11/2014 | Lafontaine et al. |
| 8,905,056 B2 | 12/2014 | Kendrick |
| 8,951,019 B2 | 2/2015 | Hains et al. |
| 8,973,560 B2 | 3/2015 | Krug |
| 8,997,904 B2 | 4/2015 | Cryer et al. |
| 9,016,383 B2 | 4/2015 | Shampine et al. |
| 9,032,620 B2 | 5/2015 | Frassinelli et al. |
| 9,057,247 B2 | 6/2015 | Kumar et al. |
| 9,103,193 B2 | 8/2015 | Coli et al. |
| 9,121,257 B2 | 9/2015 | Coli et al. |
| 9,140,110 B2 | 9/2015 | Coli et al. |
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 | 12/2015 | Walls |
| 9,324,049 B2 | 4/2016 | Thomeer et al. |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,435,333 B2 | 9/2016 | McCoy et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oering et al. |
| 9,845,730 B2 | 12/2017 | Betti et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,879,609 B1 | 1/2018 | Crowe et al. |
| RE46,725 E | 2/2018 | Case et al. |
| 9,893,500 B2 | 2/2018 | Oehring et al. |
| 9,893,660 B2 | 2/2018 | Peterson et al. |
| 9,897,003 B2 | 2/2018 | Motakef et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,293 B2 | 8/2018 | Del Bono |
| 10,060,349 B2 | 8/2018 | Álvarez et al. |
| 10,077,933 B2 | 9/2018 | Nelson et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,134,257 B2 | 11/2018 | Zhang et al. |
| 10,138,098 B2 | 11/2018 | Sorensen et al. |
| 10,151,244 B2 | 12/2018 | Giancotti et al. |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,288,519 B2 | 5/2019 | De La Cruz |
| 10,303,190 B2 | 5/2019 | Shock |
| 10,305,350 B2 | 5/2019 | Johnson et al. |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| 10,415,563 B2 * | 9/2019 | Robinson ............ F04B 39/0088 |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |

(56) References Cited

U.S. PATENT DOCUMENTS

| | | |
|---|---|---|
| 10,584,645 B2 | 3/2020 | Nakagawa et al. |
| 10,590,867 B2 | 3/2020 | Thomassin et al. |
| 10,598,258 B2 | 3/2020 | Oehring et al. |
| 10,610,842 B2 | 4/2020 | Chong |
| 10,662,749 B1 | 5/2020 | Hill et al. |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,760,556 B1 | 9/2020 | Crom et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,859,203 B1 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,871,045 B2 | 12/2020 | Fischer et al. |
| 10,900,475 B2 | 1/2021 | Weightman et al. |
| 10,907,459 B1 | 2/2021 | Yeung et al. |
| 10,927,774 B2 | 2/2021 | Cai et al. |
| 10,954,770 B1 | 3/2021 | Yeung et al. |
| 10,954,855 B1 | 3/2021 | Ji et al. |
| 10,961,614 B1 | 3/2021 | Yeung et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 10,961,993 B1 | 3/2021 | Ji et al. |
| 10,892,596 B2 | 4/2021 | Yeung et al. |
| 10,968,837 B1 | 4/2021 | Yeung et al. |
| 10,982,523 B1 | 4/2021 | Hill et al. |
| 10,989,019 B2 | 4/2021 | Cai et al. |
| 10,989,180 B2 | 4/2021 | Yeung et al. |
| 10,995,564 B2 | 5/2021 | Miller et al. |
| 11,002,189 B2 | 5/2021 | Yeung et al. |
| 11,008,950 B2 | 5/2021 | Ethier et al. |
| 11,015,423 B1 | 5/2021 | Yeung et al. |
| 11,015,536 B2 | 5/2021 | Yeung et al. |
| 11,015,594 B2 | 5/2021 | Yeung et al. |
| 11,022,526 B1 | 6/2021 | Yeung et al. |
| 11,028,677 B1 | 6/2021 | Yeung et al. |
| 11,035,213 B2 | 6/2021 | Dusterhoft et al. |
| 11,035,214 B2 | 6/2021 | Cui et al. |
| 11,047,379 B1 | 6/2021 | Li et al. |
| 10,895,202 B1 | 7/2021 | Yeung et al. |
| 11,053,853 B2 | 7/2021 | Li et al. |
| 11,060,455 B1 | 7/2021 | Yeung et al. |
| 11,066,915 B1 | 7/2021 | Yeung et al. |
| 11,085,281 B1 | 8/2021 | Yeung et al. |
| 11,085,282 B2 | 8/2021 | Mazrooee et al. |
| 11,092,152 B2 | 8/2021 | Yeung et al. |
| 11,098,651 B1 | 8/2021 | Yeung et al. |
| 11,105,250 B1 | 8/2021 | Zhang et al. |
| 11,105,266 B2 | 8/2021 | Zhou et al. |
| 11,109,508 B1 | 8/2021 | Yeung et al. |
| 11,111,768 B1 | 9/2021 | Yeung et al. |
| 11,125,066 B1 | 9/2021 | Yeung et al. |
| 11,125,156 B2 | 9/2021 | Zhang et al. |
| 11,129,295 B1 | 9/2021 | Yeung et al. |
| 11,143,000 B2 | 10/2021 | Li et al. |
| 11,143,005 B2 | 10/2021 | Dusterhoft et al. |
| 11,143,006 B1 | 10/2021 | Zhang et al. |
| 11,149,533 B1 | 10/2021 | Yeung et al. |
| 11,149,726 B1 | 10/2021 | Yeung et al. |
| 11,156,159 B1 | 10/2021 | Yeung et al. |
| 11,174,716 B1 | 11/2021 | Yeung et al. |
| 11,193,360 B1 | 12/2021 | Yeung et al. |
| 11,193,361 B1 | 12/2021 | Yeung et al. |
| 11,205,880 B1 | 12/2021 | Yeung et al. |
| 11,205,881 B2 | 12/2021 | Yeung et al. |
| 11,208,879 B1 | 12/2021 | Yeung et al. |
| 11,208,953 B1 | 12/2021 | Yeung et al. |
| 11,220,895 B1 | 1/2022 | Yeung et al. |
| 11,236,739 B2 | 2/2022 | Yeung et al. |
| 11,242,737 B2 | 2/2022 | Zhang et al. |
| 11,243,509 B2 | 2/2022 | Cai et al. |
| 11,251,650 B1 | 2/2022 | Liu et al. |
| 11,268,346 B2 | 3/2022 | Yeung et al. |
| 11,280,266 B2 | 3/2022 | Yeung et al. |
| 11,306,835 B1 | 4/2022 | Dille et al. |
| RE49,083 E | 5/2022 | Case et al. |
| 11,346,200 B2 | 5/2022 | Cai et al. |
| 11,373,058 B2 | 6/2022 | Jaaskelainen et al. |
| RE49,140 E | 7/2022 | Case et al. |
| 11,377,943 B2 | 7/2022 | Kriebel et al. |
| RE49,155 E | 8/2022 | Case et al. |
| RE49,156 E | 8/2022 | Case et al. |
| 11,401,927 B2 | 8/2022 | Li et al. |
| 11,441,483 B2 | 9/2022 | Li et al. |
| 11,448,122 B2 | 9/2022 | Feng et al. |
| 11,555,756 B2 | 1/2023 | Yeung et al. |
| 11,560,845 B2 | 1/2023 | Yeung et al. |
| 11,572,775 B2 | 2/2023 | Mao et al. |
| 11,575,249 B2 | 2/2023 | Ji et al. |
| 11,592,020 B2 | 2/2023 | Chang et al. |
| 11,596,047 B2 | 2/2023 | Liu et al. |
| 11,598,263 B2 | 3/2023 | Yeung et al. |
| 11,603,797 B2 | 3/2023 | Zhang et al. |
| 11,607,982 B2 | 3/2023 | Tian et al. |
| 11,608,726 B2 | 3/2023 | Zhang et al. |
| 11,624,326 B2 | 4/2023 | Yeung et al. |
| 11,629,583 B2 | 4/2023 | Yeung et al. |
| 11,629,589 B2 | 4/2023 | Lin et al. |
| 11,649,766 B1 | 5/2023 | Yeung et al. |
| 11,662,384 B2 | 5/2023 | Liu et al. |
| 11,668,173 B2 | 6/2023 | Zhang et al. |
| 11,668,289 B2 | 6/2023 | Chang et al. |
| 11,677,238 B2 | 6/2023 | Liu et al. |
| 2002/0126922 A1 | 9/2002 | Cheng et al. |
| 2003/0061819 A1 | 4/2003 | Kuroki et al. |
| 2004/0016245 A1 | 1/2004 | Pierson |
| 2004/0074238 A1 | 4/2004 | Wantanabe et al. |
| 2004/0076526 A1 | 4/2004 | Fukano et al. |
| 2004/0187950 A1 | 9/2004 | Cohen et al. |
| 2004/0219040 A1 | 11/2004 | Kugelev et al. |
| 2005/0051322 A1 | 3/2005 | Speer |
| 2005/0056081 A1 | 3/2005 | Gocho |
| 2005/0139286 A1 | 6/2005 | Poulter |
| 2005/0196298 A1 | 9/2005 | Manning |
| 2005/0226754 A1 | 10/2005 | Orr et al. |
| 2005/0274134 A1 | 12/2005 | Ryu et al. |
| 2006/0061091 A1 | 3/2006 | Osterloh |
| 2006/0062914 A1 | 3/2006 | Garg et al. |
| 2006/0196251 A1 | 9/2006 | Richey |
| 2006/0211356 A1 | 9/2006 | Grassman |
| 2006/0228225 A1 | 10/2006 | Rogers |
| 2006/0260331 A1 | 11/2006 | Andreychuk |
| 2006/0272333 A1 | 12/2006 | Sundin |
| 2007/0029090 A1 | 2/2007 | Andreychuk et al. |
| 2007/0066406 A1 | 3/2007 | Keller et al. |
| 2007/0107981 A1 | 5/2007 | Sicotte |
| 2007/0125544 A1 | 6/2007 | Robinson et al. |
| 2007/0169543 A1 | 7/2007 | Fazekas |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0006089 A1 | 1/2008 | Adnan et al. |
| 2008/0098891 A1 | 5/2008 | Feher |
| 2008/0161974 A1 | 7/2008 | Alston |
| 2008/0212275 A1 | 9/2008 | Waryck et al. |
| 2008/0264625 A1 | 10/2008 | Ochoa |
| 2008/0264649 A1 | 10/2008 | Crawford |
| 2009/0064685 A1 | 3/2009 | Busekros et al. |
| 2009/0068031 A1 | 3/2009 | Gambier et al. |
| 2009/0092510 A1 | 4/2009 | Williams et al. |
| 2009/0124191 A1 | 5/2009 | Van Becelaere et al. |
| 2009/0178412 A1 | 7/2009 | Spytek |
| 2009/0249794 A1 | 10/2009 | Wilkes et al. |
| 2009/0252616 A1 | 10/2009 | Brunet et al. |
| 2009/0308602 A1 | 12/2009 | Bruins et al. |

(56) References Cited

U.S. PATENT DOCUMENTS

| | | |
|---|---|---|
| 2010/0019626 A1 | 1/2010 | Stout et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0052423 A1 | 3/2011 | Gambier et al. |
| 2011/0054704 A1 | 3/2011 | Karpman et al. |
| 2011/0085924 A1 | 4/2011 | Shampine et al. |
| 2011/0146244 A1 | 6/2011 | Farman et al. |
| 2011/0146246 A1 | 6/2011 | Farman et al. |
| 2011/0173991 A1 | 7/2011 | Dean |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0048242 A1 | 3/2012 | Sumilla et al. |
| 2012/0085541 A1 | 4/2012 | Love et al. |
| 2012/0137699 A1 | 6/2012 | Montagne et al. |
| 2012/0179444 A1 | 7/2012 | Ganguly et al. |
| 2012/0192542 A1 | 8/2012 | Chillar et al. |
| 2012/0199001 A1 | 8/2012 | Chillar et al. |
| 2012/0204627 A1 | 8/2012 | Anderl et al. |
| 2012/0255734 A1 | 10/2012 | Coli et al. |
| 2012/0310509 A1 | 12/2012 | Pardo et al. |
| 2012/0324903 A1 | 12/2012 | Dewis et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0134702 A1 | 5/2013 | Boraas et al. |
| 2013/0189915 A1 | 7/2013 | Hazard |
| 2013/0205798 A1 | 8/2013 | Kwok et al. |
| 2013/0255953 A1 | 10/2013 | Tudor |
| 2013/0259707 A1 | 10/2013 | Yin |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0000668 A1 | 1/2014 | Lessard |
| 2014/0010671 A1 | 1/2014 | Cryer et al. |
| 2014/0013768 A1 | 1/2014 | Laing et al. |
| 2014/0032082 A1 | 1/2014 | Gehrke et al. |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0095114 A1 | 4/2014 | Thomeer et al. |
| 2014/0095554 A1 | 4/2014 | Thomeer et al. |
| 2014/0123621 A1 | 5/2014 | Driessens et al. |
| 2014/0130422 A1 | 5/2014 | Laing et al. |
| 2014/0138079 A1 | 5/2014 | Broussard et al. |
| 2014/0144641 A1 | 5/2014 | Chandler |
| 2014/0147291 A1 | 5/2014 | Burnette |
| 2014/0158345 A1 | 6/2014 | Jang et al. |
| 2014/0174097 A1 | 6/2014 | Hammer et al. |
| 2014/0196459 A1 | 7/2014 | Futa et al. |
| 2014/0216736 A1 | 8/2014 | Leugemors et al. |
| 2014/0219824 A1 | 8/2014 | Burnette |
| 2014/0250845 A1 | 9/2014 | Jackson et al. |
| 2014/0251623 A1 | 9/2014 | Lestz et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2015/0027730 A1 | 1/2015 | Hall et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0214816 A1 | 7/2015 | Raad |
| 2015/0217672 A1 | 8/2015 | Shampine et al. |
| 2015/0226140 A1 | 8/2015 | Zhang et al. |
| 2015/0252661 A1 | 9/2015 | Glass |
| 2015/0275891 A1 | 10/2015 | Chong et al. |
| 2015/0337730 A1 | 11/2015 | Kupiszewski et al. |
| 2015/0340864 A1 | 11/2015 | Compton |
| 2015/0345385 A1 | 12/2015 | Santini |
| 2015/0369351 A1 | 12/2015 | Hermann et al. |
| 2016/0032703 A1 | 2/2016 | Broussard et al. |
| 2016/0032836 A1 | 2/2016 | Hawkinson et al. |
| 2016/0076447 A1 | 3/2016 | Merlo et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0123185 A1 | 5/2016 | Le Pache et al. |
| 2016/0168979 A1 | 6/2016 | Zhang et al. |
| 2016/0177675 A1 | 6/2016 | Morris et al. |
| 2016/0177945 A1 | 6/2016 | Byrne et al. |
| 2016/0186671 A1 | 6/2016 | Austin et al. |
| 2016/0195082 A1 | 7/2016 | Wiegman et al. |
| 2016/0215774 A1 | 7/2016 | Oklejas et al. |
| 2016/0230525 A1 | 8/2016 | Estz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273328 A1 | 9/2016 | Oehring |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0045055 A1 | 2/2017 | Hoefel et al. |
| 2017/0074074 A1 | 3/2017 | Joseph et al. |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0122310 A1 | 5/2017 | Guevara |
| 2017/0131174 A1 | 5/2017 | Enev et al. |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0241336 A1 | 8/2017 | Jones et al. |
| 2017/0241671 A1 | 8/2017 | Ahmad |
| 2017/0248034 A1 | 8/2017 | Dzieciol et al. |
| 2017/0248208 A1 | 8/2017 | Tamura |
| 2017/0248308 A1 | 8/2017 | Makarychev-Mikhailov et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0322086 A1 | 11/2017 | Luharuka |
| 2017/0333086 A1 | 11/2017 | Jackson |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0356470 A1 | 12/2017 | Jaffrey |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |

(56) References Cited

U.S. PATENT DOCUMENTS

| | | |
|---|---|---|
| 2018/0058171 A1 | 3/2018 | Roesner et al. |
| 2018/0087499 A1 | 3/2018 | Zhang et al. |
| 2018/0087996 A1 | 3/2018 | De La Cruz |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0313456 A1 | 11/2018 | Bayyouk et al. |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0048993 A1 | 2/2019 | Akiyama et al. |
| 2019/0063263 A1 | 2/2019 | Davis et al. |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0088845 A1 | 3/2019 | Sugi et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick |
| 2019/0153938 A1 | 5/2019 | Hammoud |
| 2019/0154020 A1 | 5/2019 | Glass |
| 2019/0155318 A1 | 5/2019 | Meunier |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0211661 A1 | 7/2019 | Reckles et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277279 A1 | 9/2019 | Byrne et al. |
| 2019/0277295 A1 | 9/2019 | Clyburn et al. |
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0337392 A1 | 11/2019 | Joshi et al. |
| 2019/0338762 A1 | 11/2019 | Curry et al. |
| 2019/0345920 A1 | 11/2019 | Surjaatmadja et al. |
| 2019/0353103 A1 | 11/2019 | Roberge |
| 2019/0356199 A1 | 11/2019 | Morris et al. |
| 2019/0376449 A1 | 12/2019 | Carrell |
| 2019/0383123 A1 | 12/2019 | Hinderliter |
| 2020/0003205 A1 | 1/2020 | Stokkevåg et al. |
| 2020/0011165 A1 | 1/2020 | George et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0109610 A1 | 4/2020 | Husoy et al. |
| 2020/0109616 A1 | 4/2020 | Oehring et al. |
| 2020/0132058 A1 | 4/2020 | Mollatt |
| 2020/0141219 A1 | 5/2020 | Oehring et al. |
| 2020/0141907 A1 | 5/2020 | Meck et al. |
| 2020/0166026 A1 | 5/2020 | Marica |
| 2020/0206704 A1 | 7/2020 | Chong |
| 2020/0208733 A1 | 7/2020 | Kim |
| 2020/0223648 A1 | 7/2020 | Herman et al. |
| 2020/0224645 A1 | 7/2020 | Buckley |
| 2020/0232454 A1 | 7/2020 | Chretien et al. |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0295574 A1 | 9/2020 | Batsch-Smith |
| 2020/0300050 A1 | 9/2020 | Oehring et al. |
| 2020/0309027 A1 | 10/2020 | Rytkonen |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325791 A1 | 10/2020 | Himmelmann |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0354928 A1 | 11/2020 | Wehler et al. |
| 2020/0355055 A1 | 11/2020 | Dusterhoft et al. |
| 2020/0362760 A1 | 11/2020 | Morenko et al. |
| 2020/0362764 A1 | 11/2020 | Saintignan et al. |
| 2020/0370394 A1 | 11/2020 | Cai et al. |
| 2020/0370408 A1 | 11/2020 | Cai et al. |
| 2020/0370429 A1 | 11/2020 | Cai et al. |
| 2020/0371490 A1 | 11/2020 | Cai et al. |
| 2020/0340322 A1 | 12/2020 | Sizemore et al. |
| 2020/0386169 A1 | 12/2020 | Hinderliter et al. |
| 2020/0386222 A1 | 12/2020 | Pham et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |

(56) References Cited

U.S. PATENT DOCUMENTS

| | | |
|---|---|---|
| 2021/0025324 A1 | 1/2021 | Morris et al. |
| 2021/0025383 A1 | 1/2021 | Bodishbaugh et al. |
| 2021/0032961 A1 | 2/2021 | Hinderliter et al. |
| 2021/0054727 A1 | 2/2021 | Floyd |
| 2021/0071503 A1 | 3/2021 | Ogg et al. |
| 2021/0071574 A1 | 3/2021 | Feng et al. |
| 2021/0071579 A1 | 3/2021 | Li et al. |
| 2021/0071654 A1 | 3/2021 | Brunson |
| 2021/0071752 A1 | 3/2021 | Cui et al. |
| 2021/0079758 A1 | 3/2021 | Yeung et al. |
| 2021/0079851 A1 | 3/2021 | Yeung et al. |
| 2021/0086851 A1 | 3/2021 | Zhang et al. |
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0190045 A1 | 6/2021 | Zhang et al. |
| 2021/0199110 A1 | 7/2021 | Albert et al. |
| 2021/0222690 A1 | 7/2021 | Beisel |
| 2021/0246774 A1 | 8/2021 | Cui et al. |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0306720 A1 | 9/2021 | Sandoval et al. |
| 2021/0308638 A1 | 10/2021 | Zhong et al. |
| 2021/0324718 A1 | 10/2021 | Anders |
| 2021/0348475 A1 | 11/2021 | Yeung et al. |
| 2021/0348476 A1 | 11/2021 | Yeung et al. |
| 2021/0348477 A1 | 11/2021 | Yeung et al. |
| 2021/0355927 A1 | 11/2021 | Jian et al. |
| 2021/0372395 A1 | 12/2021 | Li et al. |
| 2021/0376413 A1 | 12/2021 | Asfha |
| 2021/0388760 A1 | 12/2021 | Feng et al. |
| 2022/0082007 A1 | 3/2022 | Zhang et al. |
| 2022/0090476 A1 | 3/2022 | Zhang et al. |
| 2022/0090477 A1 | 3/2022 | Zhang et al. |
| 2022/0090478 A1 | 3/2022 | Zhang et al. |
| 2022/0112892 A1 | 4/2022 | Cui et al. |
| 2022/0120262 A1 | 4/2022 | Ji et al. |
| 2022/0145740 A1 | 5/2022 | Yuan et al. |
| 2022/0154775 A1 | 5/2022 | Liu et al. |
| 2022/0155373 A1 | 5/2022 | Liu et al. |
| 2022/0162931 A1 | 5/2022 | Zhong et al. |
| 2022/0162991 A1 | 5/2022 | Zhang et al. |
| 2022/0181859 A1 | 6/2022 | Ji et al. |
| 2022/0186724 A1 | 6/2022 | Chang et al. |
| 2022/0213777 A1 | 7/2022 | Cui et al. |
| 2022/0220836 A1 | 7/2022 | Zhang et al. |
| 2022/0224087 A1 | 7/2022 | Ji et al. |
| 2022/0228468 A1 | 7/2022 | Cui et al. |
| 2022/0228469 A1 | 7/2022 | Zhang et al. |
| 2022/0235639 A1 | 7/2022 | Zhang et al. |
| 2022/0235640 A1 | 7/2022 | Mao et al. |
| 2022/0235641 A1 | 7/2022 | Zhang et al. |
| 2022/0235642 A1 | 7/2022 | Zhang et al. |
| 2022/0235802 A1 | 7/2022 | Jiang et al. |
| 2022/0242297 A1 | 8/2022 | Tian et al. |
| 2022/0243613 A1 | 8/2022 | Ji et al. |
| 2022/0243724 A1 | 8/2022 | Li et al. |
| 2022/0250000 A1 | 8/2022 | Zhang et al. |
| 2022/0255319 A1 | 8/2022 | Liu et al. |
| 2022/0258659 A1 | 8/2022 | Cui et al. |
| 2022/0259947 A1 | 8/2022 | Li et al. |
| 2022/0259964 A1 | 8/2022 | Zhang et al. |
| 2022/0268201 A1 | 8/2022 | Feng et al. |
| 2022/0282606 A1 | 9/2022 | Zhong et al. |
| 2022/0282726 A1 | 9/2022 | Zhang et al. |
| 2022/0290549 A1 | 9/2022 | Zhang et al. |
| 2022/0294194 A1 | 9/2022 | Cao et al. |
| 2022/0298906 A1 | 9/2022 | Zhong et al. |
| 2023/0029574 A1 | 2/2023 | Zhang et al. |
| 2023/0029671 A1 | 2/2023 | Han et al. |
| 2023/0036118 A1 | 2/2023 | Xing et al. |
| 2023/0040970 A1 | 2/2023 | Liu et al. |
| 2023/0042379 A1 | 2/2023 | Zhang et al. |
| 2023/0047033 A1 | 2/2023 | Fu et al. |
| 2023/0048551 A1 | 2/2023 | Feng et al. |
| 2023/0049462 A1 | 2/2023 | Zhang et al. |
| 2023/0064964 A1 | 3/2023 | Wang et al. |
| 2023/0074794 A1 | 3/2023 | Liu et al. |
| 2023/0085124 A1 | 3/2023 | Zhong et al. |
| 2023/0092506 A1 | 3/2023 | Zhong et al. |
| 2023/0092705 A1 | 3/2023 | Liu et al. |
| 2023/0106683 A1 | 4/2023 | Zhang et al. |
| 2023/0107300 A1 | 4/2023 | Huang et al. |
| 2023/0107791 A1 | 4/2023 | Zhang et al. |
| 2023/0109018 A1 | 4/2023 | Du et al. |
| 2023/0116458 A1 | 4/2023 | Liu et al. |
| 2023/0117362 A1 | 4/2023 | Zhang et al. |
| 2023/0119725 A1 | 4/2023 | Wang et al. |
| 2023/0119876 A1 | 4/2023 | Mao et al. |
| 2023/0119896 A1 | 4/2023 | Zhang et al. |
| 2023/0120810 A1 | 4/2023 | Fu et al. |
| 2023/0121251 A1 | 4/2023 | Cui et al. |
| 2023/0124444 A1 | 4/2023 | Chang et al. |
| 2023/0138582 A1 | 5/2023 | Li et al. |
| 2023/0144116 A1 | 5/2023 | Li et al. |
| 2023/0145963 A1 | 5/2023 | Zhang et al. |
| 2023/0151722 A1 | 5/2023 | Cui et al. |
| 2023/0151723 A1 | 5/2023 | Ji et al. |
| 2023/0152793 A1 | 5/2023 | Wang et al. |
| 2023/0160289 A1 | 5/2023 | Cui et al. |
| 2023/0160510 A1 | 5/2023 | Bao et al. |
| 2023/0163580 A1 | 5/2023 | Ji et al. |
| 2023/0167776 A1 | 6/2023 | Cui et al. |

FOREIGN PATENT DOCUMENTS

| | | |
|---|---|---|
| CA | 2043184 | 8/1994 |
| CA | 2829762 | 9/2012 |
| CA | 2876687 A1 | 5/2014 |
| CA | 2693567 | 9/2014 |
| CA | 2964597 | 10/2017 |
| CA | 2876687 C | 4/2019 |
| CA | 2919175 | 3/2021 |
| CN | 2622404 | 6/2004 |
| CN | 2779054 | 5/2006 |
| CN | 2890325 | 4/2007 |
| CN | 200964929 Y | 10/2007 |
| CN | 101323151 A | 12/2008 |
| CN | 201190660 Y | 2/2009 |
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |
| CN | 201507271 U | 6/2010 |
| CN | 101323151 B | 7/2010 |
| CN | 201560210 U | 8/2010 |
| CN | 201581862 U | 9/2010 |
| CN | 201610728 U | 10/2010 |
| CN | 201610751 U | 10/2010 |
| CN | 201618530 U | 11/2010 |
| CN | 201661255 U | 12/2010 |
| CN | 101949382 | 1/2011 |
| CN | 201756927 U | 3/2011 |
| CN | 101414171 B | 5/2011 |
| CN | 102128011 A | 7/2011 |
| CN | 102140898 A | 8/2011 |

(56) References Cited

FOREIGN PATENT DOCUMENTS

| | | | |
|---|---|---|---|
| CN | 102155172 | A | 8/2011 |
| CN | 102182904 | | 9/2011 |
| CN | 202000930 | U | 10/2011 |
| CN | 202055781 | U | 11/2011 |
| CN | 202082265 | U | 12/2011 |
| CN | 202100216 | U | 1/2012 |
| CN | 202100217 | U | 1/2012 |
| CN | 202100815 | U | 1/2012 |
| CN | 202124340 | U | 1/2012 |
| CN | 202140051 | U | 2/2012 |
| CN | 202140080 | U | 2/2012 |
| CN | 202144789 | U | 2/2012 |
| CN | 202144943 | U | 2/2012 |
| CN | 202149354 | U | 2/2012 |
| CN | 102383748 | A | 3/2012 |
| CN | 202156297 | U | 3/2012 |
| CN | 202158355 | U | 3/2012 |
| CN | 202163504 | U | 3/2012 |
| CN | 202165236 | U | 3/2012 |
| CN | 202180866 | U | 4/2012 |
| CN | 202181875 | U | 4/2012 |
| CN | 202187744 | U | 4/2012 |
| CN | 202191854 | U | 4/2012 |
| CN | 202250008 | U | 5/2012 |
| CN | 101885307 | | 7/2012 |
| CN | 102562020 | A | 7/2012 |
| CN | 202326156 | U | 7/2012 |
| CN | 202370773 | U | 8/2012 |
| CN | 202417397 | U | 9/2012 |
| CN | 202417461 | U | 9/2012 |
| CN | 102729335 | A | 10/2012 |
| CN | 202463955 | U | 10/2012 |
| CN | 202463957 | U | 10/2012 |
| CN | 202467739 | U | 10/2012 |
| CN | 202467801 | U | 10/2012 |
| CN | 202531016 | U | 11/2012 |
| CN | 202544794 | U | 11/2012 |
| CN | 102825039 | A | 12/2012 |
| CN | 202578592 | U | 12/2012 |
| CN | 202579164 | U | 12/2012 |
| CN | 202594808 | U | 12/2012 |
| CN | 202594928 | U | 12/2012 |
| CN | 202596615 | U | 12/2012 |
| CN | 202596616 | U | 12/2012 |
| CN | 102849880 | A | 1/2013 |
| CN | 102889191 | A | 1/2013 |
| CN | 202641535 | U | 1/2013 |
| CN | 202645475 | U | 1/2013 |
| CN | 202666716 | U | 1/2013 |
| CN | 202669645 | U | 1/2013 |
| CN | 202669944 | U | 1/2013 |
| CN | 202671336 | U | 1/2013 |
| CN | 202673269 | U | 1/2013 |
| CN | 202751982 | U | 2/2013 |
| CN | 102963629 | A | 3/2013 |
| CN | 202767964 | U | 3/2013 |
| CN | 202789791 | U | 3/2013 |
| CN | 202789792 | U | 3/2013 |
| CN | 202810717 | U | 3/2013 |
| CN | 202827276 | U | 3/2013 |
| CN | 202833093 | U | 3/2013 |
| CN | 202833370 | U | 3/2013 |
| CN | 102140898 | B | 4/2013 |
| CN | 202895467 | U | 4/2013 |
| CN | 202926404 | U | 5/2013 |
| CN | 202935216 | U | 5/2013 |
| CN | 202935798 | U | 5/2013 |
| CN | 202935816 | U | 5/2013 |
| CN | 202970631 | U | 6/2013 |
| CN | 103223315 | A | 7/2013 |
| CN | 203050598 | U | 7/2013 |
| CN | 103233714 | A | 8/2013 |
| CN | 103233715 | A | 8/2013 |
| CN | 103245523 | A | 8/2013 |
| CN | 103247220 | A | 8/2013 |
| CN | 103253839 | A | 8/2013 |
| CN | 103277290 | A | 9/2013 |
| CN | 103321782 | A | 9/2013 |
| CN | 203170270 | U | 9/2013 |
| CN | 203172509 | U | 9/2013 |
| CN | 203175778 | U | 9/2013 |
| CN | 203175787 | U | 9/2013 |
| CN | 102849880 | B | 10/2013 |
| CN | 203241231 | U | 10/2013 |
| CN | 203244941 | U | 10/2013 |
| CN | 203244942 | U | 10/2013 |
| CN | 203303798 | U | 11/2013 |
| CN | 102155172 | B | 12/2013 |
| CN | 102729335 | B | 12/2013 |
| CN | 103420532 | A | 12/2013 |
| CN | 203321792 | U | 12/2013 |
| CN | 203412658 | | 1/2014 |
| CN | 203420697 | U | 2/2014 |
| CN | 203480755 | U | 3/2014 |
| CN | 103711437 | A | 4/2014 |
| CN | 203531815 | U | 4/2014 |
| CN | 203531871 | U | 4/2014 |
| CN | 203531883 | U | 4/2014 |
| CN | 203556164 | U | 4/2014 |
| CN | 203558809 | U | 4/2014 |
| CN | 203559861 | U | 4/2014 |
| CN | 203559893 | U | 4/2014 |
| CN | 203560189 | U | 4/2014 |
| CN | 102704870 | B | 5/2014 |
| CN | 203611843 | U | 5/2014 |
| CN | 203612531 | U | 5/2014 |
| CN | 203612843 | U | 5/2014 |
| CN | 203614062 | U | 5/2014 |
| CN | 203614388 | U | 5/2014 |
| CN | 203621045 | U | 6/2014 |
| CN | 203621046 | U | 6/2014 |
| CN | 203621051 | U | 6/2014 |
| CN | 203640993 | U | 6/2014 |
| CN | 203655221 | U | 6/2014 |
| CN | 103899280 | A | 7/2014 |
| CN | 103923670 | A | 7/2014 |
| CN | 203685052 | U | 7/2014 |
| CN | 203716936 | U | 7/2014 |
| CN | 103990410 | A | 8/2014 |
| CN | 103993869 | A | 8/2014 |
| CN | 203754009 | U | 8/2014 |
| CN | 203754025 | U | 8/2014 |
| CN | 203754341 | U | 8/2014 |
| CN | 203756614 | U | 8/2014 |
| CN | 203770264 | U | 8/2014 |
| CN | 203784519 | U | 8/2014 |
| CN | 203784520 | U | 8/2014 |
| CN | 104057864 | A | 9/2014 |
| CN | 203819819 | U | 9/2014 |
| CN | 203823431 | U | 9/2014 |
| CN | 203835337 | U | 9/2014 |
| CN | 104074500 | A | 10/2014 |
| CN | 203876633 | U | 10/2014 |
| CN | 203876636 | U | 10/2014 |
| CN | 203877364 | U | 10/2014 |
| CN | 203877365 | U | 10/2014 |
| CN | 203877375 | U | 10/2014 |
| CN | 203877424 | U | 10/2014 |
| CN | 203879476 | U | 10/2014 |
| CN | 203879479 | U | 10/2014 |
| CN | 203890292 | U | 10/2014 |
| CN | 203899476 | U | 10/2014 |
| CN | 203906206 | U | 10/2014 |
| CN | 104150728 | A | 11/2014 |
| CN | 104176522 | A | 12/2014 |
| CN | 104196464 | A | 12/2014 |
| CN | 104234651 | A | 12/2014 |
| CN | 203971841 | U | 12/2014 |
| CN | 203975450 | U | 12/2014 |
| CN | 204020788 | U | 12/2014 |
| CN | 204021980 | U | 12/2014 |
| CN | 204024625 | U | 12/2014 |
| CN | 204051401 | U | 12/2014 |
| CN | 204060661 | U | 12/2014 |

(56) References Cited

FOREIGN PATENT DOCUMENTS

| | | | |
|---|---|---|---|
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |
| CN | 104533392 A | 4/2015 |
| CN | 104563938 A | 4/2015 |
| CN | 104563994 A | 4/2015 |
| CN | 104563995 A | 4/2015 |
| CN | 104563998 A | 4/2015 |
| CN | 104564033 A | 4/2015 |
| CN | 204257122 U | 4/2015 |
| CN | 204283610 U | 4/2015 |
| CN | 204283782 U | 4/2015 |
| CN | 204297682 U | 4/2015 |
| CN | 204299810 U | 4/2015 |
| CN | 103223315 B | 5/2015 |
| CN | 104594857 A | 5/2015 |
| CN | 104595493 A | 5/2015 |
| CN | 104612647 A | 5/2015 |
| CN | 104612928 A | 5/2015 |
| CN | 104632126 A | 5/2015 |
| CN | 204325094 U | 5/2015 |
| CN | 204325098 U | 5/2015 |
| CN | 204326983 U | 5/2015 |
| CN | 204326985 U | 5/2015 |
| CN | 204344040 U | 5/2015 |
| CN | 204344095 U | 5/2015 |
| CN | 104727797 A | 6/2015 |
| CN | 204402414 U | 6/2015 |
| CN | 204402423 U | 6/2015 |
| CN | 204402450 U | 6/2015 |
| CN | 103247220 B | 7/2015 |
| CN | 104803568 A | 7/2015 |
| CN | 204436360 U | 7/2015 |
| CN | 204457524 U | 7/2015 |
| CN | 204472485 U | 7/2015 |
| CN | 204473625 U | 7/2015 |
| CN | 204477303 U | 7/2015 |
| CN | 204493095 U | 7/2015 |
| CN | 204493309 U | 7/2015 |
| CN | 103253839 B | 8/2015 |
| CN | 104820372 A | 8/2015 |
| CN | 104832093 A | 8/2015 |
| CN | 104863523 A | 8/2015 |
| CN | 204552723 U | 8/2015 |
| CN | 204553866 U | 8/2015 |
| CN | 204571831 U | 8/2015 |
| CN | 204703814 U | 10/2015 |
| CN | 204703833 U | 10/2015 |
| CN | 204703834 U | 10/2015 |
| CN | 105092401 A | 11/2015 |
| CN | 103233715 B | 12/2015 |
| CN | 103790927 | 12/2015 |
| CN | 105207097 | 12/2015 |
| CN | 204831952 U | 12/2015 |
| CN | 204899777 U | 12/2015 |
| CN | 102602323 | 1/2016 |
| CN | 105240064 A | 1/2016 |
| CN | 204944834 | 1/2016 |
| CN | 205042127 U | 2/2016 |
| CN | 205172478 U | 4/2016 |
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |
| CN | 108254276 A | 7/2018 |
| CN | 108311535 A | 7/2018 |
| CN | 207583576 | 7/2018 |

(56) References Cited

FOREIGN PATENT DOCUMENTS

| | | |
|---|---|---|
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108799473 | 11/2018 |
| CN | 108868675 A | 11/2018 |
| CN | 208086829 | 11/2018 |
| CN | 208089263 | 11/2018 |
| CN | 208169068 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208253147 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |

(56) References Cited

FOREIGN PATENT DOCUMENTS

| | | |
|---|---|---|
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4004854 | 8/1991 |
| DE | 4241614 | 6/1994 |
| DE | 102009022859 | 12/2010 |
| DE | 102012018825 | 3/2014 |
| DE | 102013111655 | 12/2014 |
| DE | 102015103872 | 10/2015 |
| DE | 102013114335 | 12/2020 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3049642 | 4/2018 |
| EP | 3354866 | 8/2018 |
| EP | 3075946 | 5/2019 |
| FR | 2795774 | 6/1999 |
| GB | 474072 | 10/1937 |
| GB | 1438172 | 6/1976 |
| JP | 857135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 20110133821 | 10/2011 |
| WO | 2012139380 | 10/2012 |
| WO | 2013158822 | 10/2013 |
| WO | PCT/CN2012/074945 | 11/2013 |
| WO | 2013185399 | 12/2013 |
| WO | 2015158020 | 10/2015 |
| WO | 2016014476 | 1/2016 |
| WO | 2016033983 | 3/2016 |
| WO | 2016078181 | 5/2016 |
| WO | 2016101374 | 6/2016 |
| WO | 2016112590 | 7/2016 |
| WO | 2016/186790 | 11/2016 |
| WO | 2017123656 A | 7/2017 |
| WO | 2017146279 | 8/2017 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018/132106 | 7/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019046680 | 3/2019 |
| WO | 2019060922 | 3/2019 |
| WO | 2019117862 | 6/2019 |
| WO | 2019126742 | 6/2019 |
| WO | 2019147601 | 8/2019 |
| WO | 2019169366 | 9/2019 |
| WO | 2019195651 | 10/2019 |
| WO | 2019200510 | 10/2019 |
| WO | 2019210417 | 11/2019 |
| WO | 2020018068 | 1/2020 |
| WO | 2020046866 | 3/2020 |
| WO | 2020072076 | 4/2020 |
| WO | 2020076569 | 4/2020 |
| WO | 2020097060 | 5/2020 |
| WO | 2020104088 | 5/2020 |
| WO | 2020131085 | 6/2020 |
| WO | 2020211083 | 10/2020 |
| WO | 2020211086 | 10/2020 |
| WO | 2021/038604 | 3/2021 |
| WO | 2021038604 | 3/2021 |
| WO | 2021041783 | 3/2021 |

OTHER PUBLICATIONS

Capstone Turbine Corporation, Capstone Receives Three Megawatt Order from Large Independent Oil & Gas Company in Eagle Ford Shale Play, Dec. 7, 2010.

Wikipedia, Westinghouse Combustion Turbine Systems Division, https://en.wikipedia.org/wiki/Westinghouse_Combustion_Turbine_Systems_Division, circa 1960.

Wikipedia, Union Pacific GTELs, https://en.wikipedia.org/wiki/Union_Pacific_GTELs, circa 1950.

HCI JET Frac, Screenshots from YouTube, Dec. 11, 2010. https://www.youtube.com/watch?v=6HjXkdbFaFQ.

AFD Petroleum Ltd., Automated Hot Zone, Frac Refueling System, Dec. 2018.

Eygun, Christiane, et al., URTeC: 2687987, Mitigating Shale Gas Developments Carbon Footprint: Evaluating and Implementing Solutions in Argentina, Copyright 2017, Unconventional Resources Technology Conference.

Walzel, Brian, Hart Energy, Oil, Gas Industry Discovers Innovative Solutions to Environmental Concerns, Dec. 10, 2018.

Frac Shack, Bi-Fuel FracFueller brochure, 2011.

Pettigrew, Dana, et al., High Pressure Multi-Stage Centrifugal Pump for 10,000 psi Frac Pump—HPHPS Frac Pump, Copyright 2013, Society of Petroleum Engineers, SPE 166191.

Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.

(56) References Cited

OTHER PUBLICATIONS

Wallace, E.M., Associated Shale Gas: From Flares to Rig Power, Copyright 2015, Society of Petroleum Engineers, SPE-173491-MS.
Williams, C.W. (Gulf Oil Corp. Odessa Texas), The Use of Gas-turbine Engines in an Automated High-Pressure Water-Injection Stations; American Petroleum Institute; API-63-144 (Jan. 1, 1963).
Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).
Porter, John A. (Solar Division International Harvester Co.), Modern Industrial Gas Turbines for the Oil Field; American Petroleum Institute; Drilling and Production Practice; API-67-243 (Jan. 1, 1967).
Cooper et al., Jet Frac Porta-Skid—A New Concept in Oil Field Service Pump Equipments[sic]; Halliburton Services; SPE-2706 (1969).
Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).
Kas'yanov et al., Application of gas-turbine engines in pumping units complexes of hydraulic fracturing of oil and gas reservoirs; Exposition Oil & Gas; (Oct. 2012) (published in Russian).
American Petroleum Institute. API 674: Positive Displacement Pumps—Reciprocating. 3rd ed. Washington, DC: API Publishing Services, 2010.
American Petroleum Institute. API 616: Gas Turbines for the Petroleum, Chemical, and Gas Industry Services. 5th ed. Washington, DC: API Publishing Services, 2011.
Karassik, Igor, Joseph Messina, Paul Cooper, and Charles Heald. Pump Handbook. 4th ed. New York: McGraw-Hill Education, 2008.
Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/bumpdatabase2/weir-spm-general.pdf.
The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.
Shandong Saigao Group Corporation. Q4 (5W115) Quintuplex Plunger Pump. Jinan City, Shandong Province, China: Saigao. Oct. 20, 2014. https://www.saigaogroup.com/product/q400-5w115-quintuplex-plunger-pump.html.
Marine Turbine. Turbine Powered Frac Units. Franklin, Louisiana: Marine Turbine Technologies, 2020.
Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.
CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.
Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.
ResearchGate, Answer by Byron Woolridge, found at https://www.researchgate.net/post/low_can_we_improve_the_efficiency_of_the_gas_turbine_cycles, Jan. 1, 2013.
Filipović, Ivan, Preliminary Selection of Basic Parameters of Different Torsional Vibration Dampers Intended for use in Medium-Speed Diesel Engines, Transactions of Famena XXXVI-3 (2012).
Marine Turbine Technologies, 1 MW Power Generation Package, http://marineturbine.com/power-generation, 2017.
Business Week: Fiber-optic cables help fracking, cablinginstall.com. Jul. 12, 2013. https://www.cablinginstall.com/cable/article/16474208/businessweek-fiberoptic-cables-help-fracking.
Fracking companies switch to electric motors to power pumps, iadd-intl.org. Jun. 27, 2019. https://www.iadd-intl.org/articles/fracking-companies-switch-to-electric-motors-to-power-pumps/.
The Leader in Frac Fueling, suncoastresources.com. Jun. 29, 2015. https://web.archive.org/web/20150629220609/https://www.suncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac.aspx.
PLOS ONE, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Gardner Denver Hydraulic Fracturing Pumps GD 3000 https://www.gardnerdenver.com/en-us/pumps/triplex-fracking-pump-gd-3000.
Ekontsev, Yu M., et al. "Two-side sealer operation." Journal of Mining Science 49.5 (2013): 757-762.
Tom Hausfeld, GE Power & Water, and Eldon Schelske, Evolution Well Services, TM2500+ Power for Hydraulic Fracturing.
FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
PbNG, Natural Gas Fuel for Drilling and Hydraulic Fracturing, Diesel Displacement / Dual Fuel & Bi-Fuel, May 2014.
Integrated Flow, Skid-mounted Modular Process Systems, Jul. 15, 2017, https://ifsolutions.com/why-modular/.
Cameron, A Schlumberger Company, Frac Manifold Systems, 2016.
ZSi-Foster, Energy | Solar | Fracking | Oil and Gas, Aug. 2020, https://www.zsi-foster.com/energy-solar-fracking-oil-and-gas.html.
JBG Enterprises, Inc., WS-Series Blowout Prevention Safety Coupling—Quick Release Couplings, Sep. 11, 2015, http://www.jgbhose.com/products/WS-Series-Blowout-Prevention-Safety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
Wolf, Jürgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
II-VI Marlow Industries, Thermoelectric Technologies in Oil, Gas, and Mining Industries, blog.marlow.com (Jul. 24, 2019).
B.M. Mahlalela, et al., .Electric Power Generation Potential Based on Waste Heat and Geothermal Resources in South Africa, pangea.stanford.edu (Feb. 11, 2019).
Department of Energy, United States of America, The Water-Energy Nexus: Challenges and Opportunities purenergypolicy.org (Jun. 2014).

(56) References Cited

OTHER PUBLICATIONS

Ankit Tiwari, Design of a Cooling System for a Hydraulic Fracturing Equipment, The Pennsylvania State University, The Graduate School, College of Engineering, 2015.
Jp Yadav et al., Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia, Nov. 3, 2012.
Blago Minovski, Coupled Simulations of Cooling and Engine Systems for Unsteady Analysis of the Benefits of Thermal Engine Encapsulation, Department of Applied Mechanics, Chalmers University of Technology Göteborg, Sweden 2015.
J. Porteiro et al., Feasibility of a new domestic CHP trigeneration with heat pump: II. Availability analysis. Design and development, Applied Thermal Engineering 24 (2004) 1421-1429.
ISM, What is Cracking Pressure, 2019.
Swagelok, The right valve for controlling flow direction? Check, 2016.
Technology.org, Check valves how do they work and what are the main type, 2018.
AFGlobal Corporation, Durastim Hydraulic Fracturing Pump, A Revolutionary Design for Continuous Duty Hydraulic Fracturing, 2018.
SPM® QEM 5000 E-Frac Pump Specification Sheet, Weir Group (2019) ("Weir 5000").
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Dowell B908 "Turbo-Jet" Operator's Manual.
Jereh Debut's Super-power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www.prnewswire.com/news-releases/jereh-apollo-4500-turbine-frac-pumper-finishes-successful-field-operation-in-china-300035829.html.
35% Economy Increase, Dual-fuel System Highlighting Jereh Apollo Frac Pumper, Jereh Group (Apr. 13, 2015), https://www.jereh.com/en/news/press-release/news-detail-7345.htm.
Hydraulic Fracturing: Gas turbine proves successful in shale gas field operations, Vericor (2017), https://www.vericor.com/wp-content/uploads/2020/02/7.-Fracing-4500hp-Pump-China-En.pdf ("Vericor Case Study").
Jereh Apollo Turbine Fracturing Pumper Featured on China Central Television, Jereh Group (Mar. 9, 2018), https://www.jereh.com/en/news/press-release/news-detail-7267.htm.
Jereh Unveiled New Electric Fracturing Solution at OTC 2019, Jereh Group (May 7, 2019), as available on May 28, 2019, https://web.archive.org/web/20190528183906/https://www.prnewswire.com/news-releases/jereh-unveiled-new-electric-fracturing-solution-at-otc-2019-300845028.html.
Jereh Group, Jereh Fracturing Unit, Fracturing Spread, YouTube (Mar. 30, 2015), https://www.youtube.com/watch?v=PIkDbU5dE0o.
Transcript of Jereh Group, Jereh Fracturing Unit, Fracturing Spread, YouTube (Mar. 30, 2015).
Jereh Group, Jereh Fracturing Equipment. YouTube (Jun. 8, 2015), https://www.youtube.com/watch?v=m0vMiq84P4Q.
Transcript of Jereh Group, Jereh Fracturing Equipment, YouTube (Jun. 8, 2015), https://www.youtube.com/watch?v=m0vMiq84P4Q.
Ferdinand P. Beer et al., Mechanics of Materials (6th ed. 2012).
Weir Oil & Gas Introduces Industry's First Continuous Duty 5000-Horsepower Pump, Weir Group (Jul. 25, 2019), https://www.global.weir/newsroom/news-articles/weir-oil-and-gas-introduces-industrys-first-continuous-duty-5000-horsepower-pump/.
2012 High Horsepower Summit Agenda, Natural Gas for High Horsepower Applications (Sep. 5, 2012).
Review of HHP Summit 2012, Gladstein, Neandross & Associates https://www.gladstein.org/gna-conferences/high-horsepower-summit-2012/.
Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.
Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.com/news/oil-gas/a/124883/Turbine_Technology_Powers_Green_Field_MultiFuel_Frack_Pump.
"Turbine Frac Units," WMD Squared (2012), https://wmdsquared.com/work/gfes-turbine-frac-units/.
Leslie Turj, Green Field asset sale called 'largest disposition industry has seen,' The INDsider Media (Mar. 19, 2014), http://theind.com/article-16497-green-field-asset-sale-called-%E2%80%98largest-disposition-industry-has-seen%60.html.
"Honghua developing new-generation shale-drilling rig, plans testing of frac pump"; Katherine Scott; Drilling Contractor May 23, 2013; accessed at https://www.drillingcontractor.org/honghua-developing-new-generation-shale-drilling-rig-plans-testing-of-frac-pump-23278.
De Gevigney et al., "Analysis of No. load dependent power losses in a planetary gear train by using thermal network method", International Gear Conference 2014: 26th-28th, Aug. 2014, Lyon, pp. 615-624.
Special-Purpose Couplings for Petroleum, Chemical, and Gas Industry Services, API Standard 671 (4th Edition) (2010).
The Application of Flexible Couplings for Turbomachinery, Jon R.Mancuso et al., Proceedings of the Eighteenthturbomachinery Symposium (1989).
Pump Control With Variable Frequency Drives, Kevin Tory, Pumps & Systems: Advances in Motors and Drives, Reprint from Jun. 2008.
Fracture Design and Stimulation, Mike Eberhard, P.E., Wellconstruction & Operations Technical Workshop Insupport of the EPA Hydraulic Fracturing Study, Mar. 10-11, 2011.
General Purpose vs. Special Purpose Couplings, Jon Mancuso, Proceedings of the Twenty-Third Turbomachinerysymposium (1994).
Overview of Industry Guidance/Best Practices on Hydraulic Fracturing (HF), American Petroleum Institute, © 2012.
API Member Companies, American Petroleum Institute, WaybackMachine Capture, https://web.archive.org/web/20130424080625/http://api.org/globalitems/globalheaderpages/membership/api-member-companies, accessed Jan. 4, 2021.
API's Global Industry Services, American Petroleum Institute, © Aug. 2020.
About API, American Petroleum Institute, https://www.api.org/about, accessed Dec. 30, 2021.
About API, American Petroleum Institute, WaybackMachine Capture, https://web.archive.org/web/20110422104346/http://api.org/aboutapi/, captured Apr. 22, 2011.
Publications, American Petroleum Institute, WaybackMachine Capture, https://web.archive.org/web/20110427043936/http://www.api.org:80/Publications/, captured Apr. 27, 2011.
Procedures for Standards Development, American Petroleum Institute, Third Edition (2006).

(56) References Cited

OTHER PUBLICATIONS

WorldCat Library Collections Database Records for API Standard 671 and API Standard 674, https://www.worldcat.org/title/positive-displacement-pumps-reciprocating/oclc/ 858692269&referer=brief_results, accessed Dec. 30, 2021; and https://www.worldcat.org/title/special-purpose-couplings-for-petroleum-chemical-and-gas-industry-services/oclc/871254217&referer=brief_results, accessed Dec. 22, 2021.

2011 Publications and Services, American Petroleum Institute (2011). Standards, American Petroleum Institute, WaybackMachine Capture, https://web.archive.org/web/20110207195046/http:/www.api.org/Standards/, captured Feb. 7, 2011; and https://web.archive.org/web/20110204112554/http://global.ihs.com/?RID=API1, captured Feb. 4, 2011.

IHS Markit Standards Store, https://global.ihs.com/doc_detail.cfm?document_name=API%20STD%20674&item_s_key=00010672#doc-detail-history-anchor, accessed Dec. 30, 2021; and https://global.ihs.com/doc_detail.cfm?&input_doc_number=671&input_doc_title=&document_name=API%20STD%20671&item_s_key=00010669&item_key_date=890331&origin=DSSC, accessed Dec. 30, 2021.

Dziubak, Tadeusz, "Experimental Studies of Dust Suction Irregularity from Multi-Cyclone Dust Collector of Two-Stage Air Filter", Energies 2021, 14, 3577, 28 pages.

* cited by examiner

| With Assumed m, r1 and Known Intertia ||||||
|---|---|---|---|---|---|
| $I = 1.047$ (kg-m$^2$) | m (kg) | r1 (m) | r2 (m) | m (lb) | r1 (in) | r2 (in) |
| | 10 | 0.0635 | 0.4533 | 22.05 | 2.50 | 17.85 |
| | 15 | 0.0635 | 0.3683 | 33.075 | 2.50 | 14.50 |
| | 20 | 0.0635 | 0.3174 | 44.1 | 2.50 | 12.49 |
| | 25 | 0.0635 | 0.2824 | 55.125 | 2.50 | 11.12 |
| | 30 | 0.0635 | 0.2565 | 66.15 | 2.50 | 10.10 |
| | 35 | 0.0635 | 0.2363 | 77.175 | 2.50 | 9.30 |
| | 40 | 0.0635 | 0.2199 | 88.2 | 2.50 | 8.66 |
| | 45 | 0.0635 | 0.2062 | 99.225 | 2.50 | 8.12 |
| | 50 | 0.0635 | 0.1946 | 110.25 | 2.50 | 7.66 |
| | 55 | 0.0635 | 0.1845 | 121.275 | 2.50 | 7.27 |
| | 60 | 0.0635 | 0.1757 | 132.3 | 2.50 | 6.92 |
| | 65 | 0.0635 | 0.1679 | 143.325 | 2.50 | 6.61 |
| | 70 | 0.0635 | 0.1609 | 154.35 | 2.50 | 6.34 |
| | 75 | 0.0635 | 0.1546 | 165.375 | 2.50 | 6.09 |
| | 80 | 0.0635 | 0.1488 | 176.4 | 2.50 | 5.86 |
| | 85 | 0.0635 | 0.1436 | 187.425 | 2.50 | 5.65 |
| | 90 | 0.0635 | 0.1387 | 198.45 | 2.50 | 5.46 |
| | 95 | 0.0635 | 0.1342 | 209.475 | 2.50 | 5.28 |
| | 100 | 0.0635 | 0.1301 | 220.5 | 2.50 | 5.12 |
| | 105 | 0.0635 | 0.1262 | 231.525 | 2.50 | 4.97 |
| | 110 | 0.0635 | 0.1225 | 242.55 | 2.50 | 4.82 |
| | 115 | 0.0635 | 0.1191 | 253.575 | 2.50 | 4.69 |

FIG. 5

SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP

PRIORITY CLAIMS

This is a continuation of U.S. Non-Provisional application Ser. No. 17/585,766, filed Jan. 27, 2022, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," which is a continuation of U.S. Non-Provisional application Ser. No. 17/469,970, filed Sep. 9, 2021, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,280,331, issued Mar. 22, 2022, which is a continuation of U.S. Non-Provisional application Ser. No. 17/363,151, filed Jun. 30, 2021, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,149,726, issued Oct. 19, 2021, which is a continuation of U.S. Non-Provisional application Ser. No. 17/213,562, filed Mar. 26, 2021, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,092,152, issued Aug. 17, 2021, which is a continuation of U.S. Non-Provisional application Ser. No. 16/948,291, filed Sep. 11, 2020, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,015,594, issued May 25, 2021, which claims priority to and the benefit of U.S. Provisional Application No. 62/704,560, filed May 15, 2020, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," and U.S. Provisional Application No. 62/899,963, filed Sep. 13, 2019, titled "USE OF SINGLE MASS FLYWHEEL ALONGSIDE TORSIONAL VIBRATION DAMPER SYSTEM FOR SINGLE ACTING RECIPROCATING PUMP," the disclosures of which are incorporated herein by reference in their entireties.

TECHNICAL FIELD

The present disclosure relates to single acting reciprocating pumps and, more specifically, to single mass flywheels and torsional vibration dampers for use with single acting reciprocating pumps.

DISCUSSION OF RELATED ART

During fracturing operations, high and low frequency torsional vibration is a common occurrence through the driveline. Such torsional vibration is typically generated via the operation of a reciprocating pump. Reciprocating pumps are driven to pump "slugs" of fluid with as the pump reciprocates or cycles. The speed and operating pressure of the pump influences the amount of fluid pumped downstream of the pump. As the reciprocating pump is cycled, movement of the slugs create pressure fluctuations within fluid downstream of the pump. This pressure fluctuation may create "hydraulic fluid pulsation" within the pump that is added to the operating pressure of the pump. The hydraulic fluid pulsation may be transferred upstream to driving equipment used to drive the pump in the form of torque output variances. The driving equipment may include one or more components including, but not limited to, a driveshaft, an engine, a transmission, or a gearbox.

As noted, the nature of the suction and discharge strokes of the reciprocating pump generate variable torque spikes that originate from the discharge of high pressure fluid and may migrate through the drive line and cause damage and premature wear on the driveline components including the prime mover. Problematically, each reciprocating pumps operating in the field generally have their own torsional vibration frequency and amplitude profile that is dependent upon the selected operational pressure and rate. Another problem arises when a group of reciprocating pumps are connected to a common discharge line. In this operational scenario, reciprocating pumps may begin to synchronize such that the natural sinusoidal wave form of one pump will begin to mirror that of another pump from the group, which promotes pressure spikes and torsional distortion of even higher amplitude to pulsate through the drive lines.

The torque output variances may create shock loading in the pump and in the driving equipment upstream from the pump. This shock loading may shorten the life of the driving equipment including causing failure of one or more components of the driving equipment. In addition, driving equipment such as combustion engines, e.g., gas turbine engines, have a movement of inertia, natural damping effects, and stiffness coefficients. Some driving equipment may have low natural damping effects that may allow for torsional resonance interaction within the driving equipment and/or between the driving equipment and the pump. This torsional resonance may shorten the life of the driving equipment including causing failure of one or more components of the driving equipment.

Thus there is a need to provide protection of hydraulic drive line fracturing equipment from imposed high frequency/low amplitude and low frequency/high amplitude torsional vibrations.

SUMMARY

This disclosure relates generally to vibration dampening assemblies for use with pump systems including a reciprocating pump and driving equipment configured to cycle the pump. The vibration dampening assemblies may include single mass flywheel(s) and/or torsional vibration dampener(s) to reduce or eliminate upstream shock loading and/or dampen torsional resonance from reaching the driving equipment; i.e., to reduce or eliminate pump imposed high frequency/low amplitude and low frequency/high amplitude torsional vibrations.

According to some embodiments, a single mass flywheel or a series of single mass flywheels along the drive-train system components between the gear box or transmission and input shaft of a reciprocating pump may be used to reduce output speed fluctuations that may cause vibrational and torsional effects on the gearbox and engine. Further, at least one torsional vibration dampener may be connected to the drive-train system to dampen the harmonic effects of the reciprocating pump. According to some embodiments, the at least one flywheel and the at least one torsional damper may not require electrical control to be able to function, but it is contemplated that electrical sensors and instrumentation may be present to monitor the condition of the drive line.

According to some embodiments, a pump system may include a pump, a driveshaft, driving equipment, and a vibration dampening assembly. The pump may have an input shaft that is connected to the driveshaft. The driving equipment may include an output shaft that has an output flange connected to the driveshaft. The driving equipment may be configured to rotate the driveshaft to rotate the input shaft of the pump therewith. The vibration dampening assembly may include at least one flywheel that is operably connected to the input shaft and is configured to rotate therewith. The input shaft may include an input flange that is connected to the driveshaft. According to some embodiments, the at least one flywheel may comprise a first flywheel.

According to some embodiments, the pump may be a single acting reciprocating pump. The first flywheel may be a single mass flywheel. The first flywheel may be connected to the output flange of the driving equipment or the first flywheel may be connected to the input flange of the single acting reciprocating pump.

In some embodiments, the vibration dampening assembly may include at least one torsional vibration damper that is operably connected to the input shaft. According to some embodiments, the at least one torsional vibration damper may comprise a first torsional vibration damper that may be connected to the input flange of the pump, may be connected to the output flange of the driving equipment, and/or may be connected to the first flywheel.

According to some embodiments, the first flywheel may be connected to the output flange of the driving equipment and the first torsional vibration damper may be connected to the first flywheel. The vibration dampening assembly may include a second torsional vibration damper that may be connected to the input flange.

According to some embodiments, the vibration damping system may include a second flywheel that may be connected to the input flange. The second torsional vibration damper may be connected to the second flywheel.

According to some embodiments, the first and/or the second flywheel may be configured to absorb a torque shock in the form of torque variance resulting from hydraulic fluid pulsation within the pump. The first and/or second torsional vibration damper may be configured to reduce torsional resonance within the driving equipment or the pump.

According to some embodiments, a method of sizing a flywheel for a pump system that has a single acting reciprocating pump and driving equipment configured to cycle the pump may include calculating a desired moment of inertia of the flywheel and sizing the flywheel to have the desired moment of inertia. The desired moment of inertia may be calculated using a kinetic energy "KE" of a torque variance within the pump system above a nominal torque of the pump system that results from hydraulic fluid pulsation within the pump.

In some embodiments, calculating the desired moment of inertia of the flywheel may include calculating a first desired moment of inertia of a first flywheel from a first portion of the kinetic energy "KE" of the torque variance within the pump system as a result of hydraulic fluid pulsation within the pump, and calculating a second desired moment of inertia of a second flywheel from a second portion of the kinetic energy "KE" of the torque variance within the pump system as a result of hydraulic fluid pulsation within the pump. The first portion may be greater than, lesser than, or equal to the second portion. Sizing the flywheel may include sizing the first flywheel to have the first desired moment of inertia and sizing the second flywheel to have the second desired moment of inertia.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced. According to common practice, the various features of the drawings discussed below are not necessarily drawn to scale. Dimensions of various features and elements in the drawings may be expanded or reduced to more clearly illustrate the embodiments of the disclosure.

FIG. 5 is a table providing exemplary properties of flywheels that each have the same moment of inertia.

DETAILED DESCRIPTION

Figure 1:
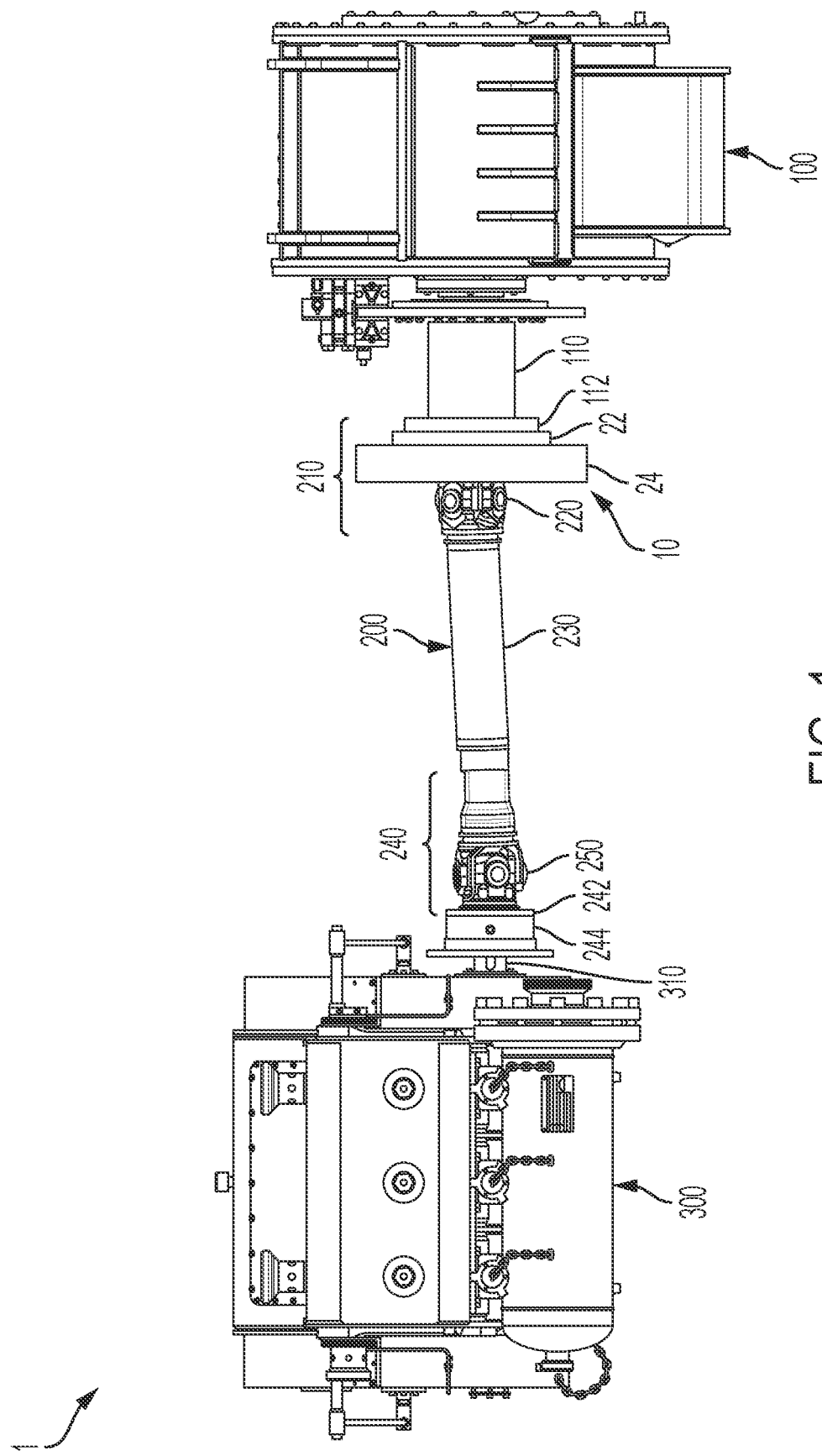
FIG. 1 is a schematic view of a pump system having a first exemplary embodiment of a vibration dampening assembly provided according to an embodiment of the disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect may be combined with features from any other embodiment or aspect in any appropriate combination. For example, any individual or collective features of method aspects or embodiments may be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements.

As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Referring now to FIG. 1, an exemplary pump system 1 having a vibration dampening assembly 10 described in accordance with the present disclosure. The pump system 1 includes driving equipment 100 and driven components including a driveshaft 200 and a pump 300. The vibration dampening assembly 10 is secured to portions of a pump system 1 between the driving equipment 100 and the pump 300 to dampen upstream high frequency/low amplitude and low frequency/high amplitude torsional vibrations generated by the operating pump 300 from reaching the driving equipment 100.

The driving equipment 100 is illustrated as a power transfer case. In some embodiments, the driving equipment 100 includes a driveshaft, a transmission, a gearbox, or an engine, e.g., an internal combustion engine or a gas turbine engine. The driving equipment 100 includes an output shaft 110 that has an output flange 112. The driving equipment 100 is configured to rotate the output shaft 110 about a longitudinal axis thereof. The driving equipment 100 may include an engine and a transmission, gearbox, and/or power transfer case that may be configured to increase a torque and decrease a rotational speed of the output shaft 110 relative to a driveshaft of the engine or that may be configured to decrease a torque and increase a rotational speed of the output shaft 110 relative to a driveshaft of the engine. The pump 300 includes in input shaft 310 having an input flange that is configure to receive input from the driving equipment 100 in the form of rotation of the input flange about a longitudinal axis of the input shaft 310.

The driveshaft 200 has a driving or upstream portion 210, a driven or downstream portion 240, and a central portion 230 between the upstream and downstream portions 210, 240. The upstream portion 210 includes an upstream flange (not shown) that is connected to the output flange 112 of the driving equipment 100 such that the upstream portion 210 rotates in response or in concert with rotation of the output shaft 110. The central portion 230 is secured to the upstream portion 210 and rotates in concert therewith. The downstream portion 240 is secured to the central portion 230 and rotates in concert therewith. The downstream portion 240 includes a downstream flange 242 that is connected to an input flange of the pump 300 such that the input flange rotates in response or in concert with rotation of the driveshaft 200. The downstream portion 240 may also include a spindle 244 adjacent the downstream flange 242. The upstream flange (not shown) may be similar to downstream flange 242 and the upstream portion 210 may include a spindle (not shown) that is similar to the spindle 244 of the downstream portion 240.

In some embodiments, the output shaft 110 of the driving equipment 100 is offset from the input shaft 310 of the pump 300 such that the longitudinal axis of the output shaft 110 is out of alignment, i.e., not coaxial with, the longitudinal axis of the input shaft 310. In such embodiments, the upstream portion 210 or the downstream portion 240 may include a constant velocity (CV) joint 220, 250 between the spindle 244 and the central portion 230. The CV joints 220, 250 allow for the output shaft 110 to be operably connected to the input shaft 310 when the output and input shafts 110, 310 are offset from one another.

During operation, the output shaft 110 is rotated by the driving equipment 100 to rotate the input shaft 310 of the pump 300 such that the pump 300 is driven to pump slugs of fluid. Specifically, the driving equipment 100 is configured to rotate the input shaft 310 at a constant velocity such that the pump 300 provides a constant flow of fluid. As the pump 300 pumps slugs of fluid, the pulses of the slugs of fluid create a pulsation pressure that adds to the nominal operating pressure of the pump 300.

Figure 2:
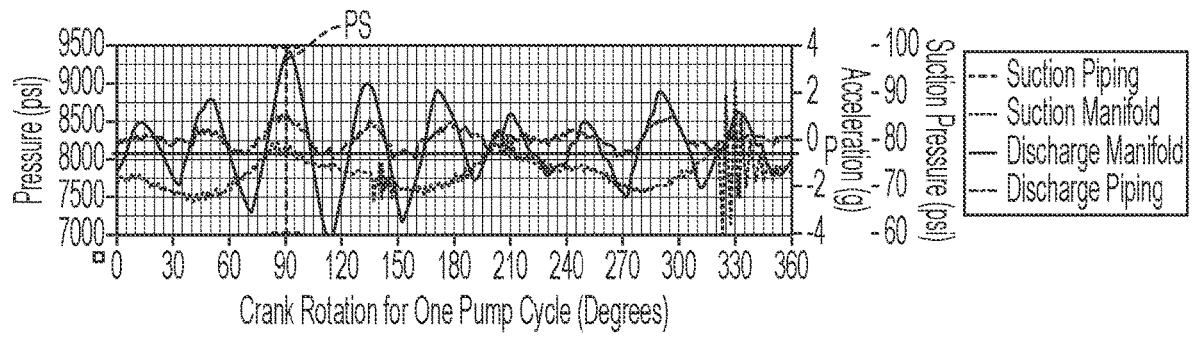
FIG. 2 is a graph illustrating a pressure, acceleration, and suction pressure of an exemplary pump of the pump system of FIG. 1 through a cycle of the pump according to an embodiment of the disclosure.

With additional reference to FIG. 2, the pressure P of the pump 300 is illustrated through an exemplary cycle of the pump 300. The pump 300 has a nominal pressure PN of 8250 psi with a normal operating pressure in a range of 7500 psi to 9000 psi. The pulsations of the operating pressure illustrate the pulsation pressure described above which is known as "hydraulic fluid pulsation." This hydraulic fluid pulsation may lead to pressure spikes $P_S$ as illustrated between points 60 and 150 of the cycle of the pump 300 in FIG. 2. The pressure spikes $P_S$ are measured as peak to peak pressure variations, which as shown in FIG. 2 is 2,500 psi.

The hydraulic fluid pulsation describe above may be transferred upstream from the pump 300 to the driving equipment 100 through the driveshaft 200. Specifically, the hydraulic fluid pulsation results in torque variations in a crank/pinion mechanism of the pump 300 that are transferred upstream as torque output variations at the input shaft 310 of the pump 300. These torque output variations may create a torsional shock $T_S$ at the output flange 112 of the output shaft 110. A single large torsional shock $T_S$ may damage components of the driving equipment 100. In addition, an accumulation of minor or small torsional shocks $T_S$ may decrease a service life of one or more of the components of the driving equipment 100.

With continued reference to FIG. 1, the vibration dampening assembly 10 is provided to reduce the transfer of the torsional shock $T_S$ upstream to the driving equipment 100. The vibration dampening assembly 10 may include at least one flywheel. In one aspect, the at least one flywheel may comprise a flywheel 22 that is connected to the output flange 112 and disposed about the upstream portion 210 of the driveshaft 200. In some embodiments, the flywheel 22 may be connected to the output flange 112 and be disposed about the output shaft 110.

Figure 3:
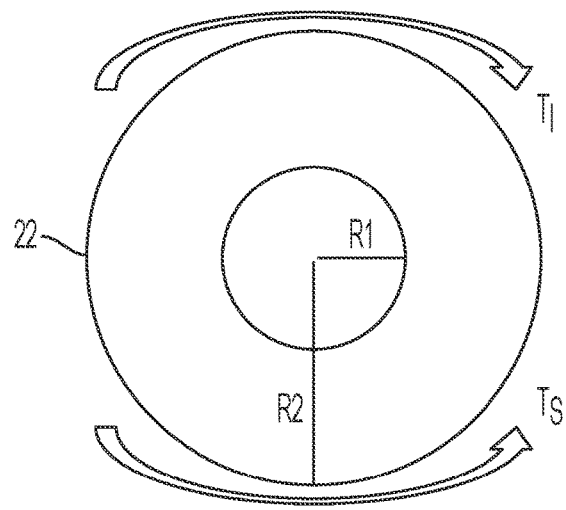
FIG. 3 is a schematic front view of a flywheel of the pump system of FIG. 1 according to an embodiment of the disclosure.

As the output shaft 110 rotates the driveshaft 200, the flywheel 22 rotates in concert with the output shaft 110. As shown in FIG. 3, torque provided by the driving equipment 100 to the input shaft 310 of the pump 300 is illustrated as an input torque Ti and the torque output variations at the input shaft 310 of the pump 300 result in a reaction torque illustrated as torque spikes $T_S$. As the flywheel 22 rotates, angular momentum of the flywheel 22 counteracts a portion of or the entire torque output variances and reduces or eliminates torsional shock $T_S$ from being transmitted upstream to the driving equipment 100. Incorporation of the flywheel 22 into the vibration dampening assembly 10 allows for the vibration dampening assembly 10 to dampen the low frequency, high amplitude torsional vibrations imposed on the drivetrain system that is caused by the hydraulic fluid pulsation.

The angular momentum of the flywheel 22 may be calculated as a rotational kinetic energy "KE" of the flywheel 22. The "KE" of the flywheel 22 may be used to absorb or eliminate a percentage of the torsional shock $T_S$. The "KE" of the flywheel 22 is a function of the moment of inertia "I" of the flywheel 22 and the angular velocity "ω" of the flywheel 22 which may be expressed as:

$$KE = \frac{1}{2}(I\omega)^2 \quad (1)$$

Figure 4:
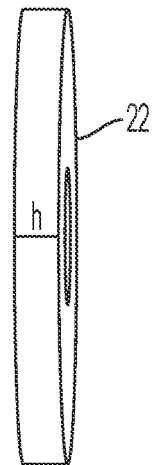
FIG. 4 is a schematic side view of the flywheel of the pump system of FIG. 3 according to an embodiment of the disclosure.

As noted above, the driving equipment 100 is configured to rotate at a constant angular velocity "ω" such that with a known "KE" or a known moment of inertia "I" the other of the "KE" or the moment of inertia "I" may be calculated. In addition, the moment of inertia "I" of the flywheel 22 is dependent on the mass "m" and the radial dimensions of the flywheel 22 and may be expressed as:

$$I = \frac{m(r_1^2 + r_2^2)}{2} \quad (2)$$

where $r_1$ is a radius of rotation and $r_2$ is a flywheel radius as shown in FIG. 3. This equation assumes that the flywheel 22 is formed of a material having a uniform distribution of mass. In some embodiments, the flywheel 22 may have a non-uniform distribution of mass where the mass is concentrated away from the center of rotation to increase a moment of inertia "I" of the flywheel 22 for a given mass. It will be appreciated that the mass may be varied for a given a radius of rotation $r_1$ and a given a flywheel radius $r_2$ by varying a thickness "h" of the flywheel 22 in a direction parallel an axis of rotation of the flywheel 22 as shown in FIG. 4.

The dimensions and mass of the flywheel 22 may be sized such that the flywheel 22 has a "KE" similar to a "KE" of an anticipated torque variance above a nominal operating torque of the pump 300. In some embodiments, the flywheel 22 maybe sized such that the "KE" of the flywheel 22 is greater than an anticipated torque variance such that the flywheel has a "KE" greater than any anticipated torque variance and in other embodiments, the flywheel 22 may be sized such that the "KE" of the flywheel 22 is less than the anticipated torque variance such that the flywheel 22 is provided to absorb or negate only a portion of the anticipated torque variances. In particular embodiments, the flywheel 22 is sized such that the "KE" of the flywheel 22 is equal to the anticipated torque variance such that the flywheel 22 is provided to absorb or negate the anticipated torque variance while minimizing a moment of inertia "I" of the flywheel 22.

The rotational kinetic energy "KE" of the torque variance is calculated from the specifications of a particular pump, e.g., pump 300, and from empirical data taken from previous pump operations as shown in FIG. 2. For example, as shown in FIG. 2, the pressure spike $P_S$ is analyzed to determine a magnitude of the pressure spike $P_S$ and a duration of the pressure spike $P_S$. As shown, the duration of the pressure spike $P_S$ occurred over 0.628 radians of the cycle and using the specification of the pump resulted in a torque above the nominal operating torque of 1420 lb-ft. From these values and given the constant velocity of the particular pump of 152.4 radians/second, the "KE" of a torque variance resulting from the pressure spike $P_S$ may be calculated as 8922 lb-ft or 12,097 N-m of work.

The "KE" of the torque variance may be used to size a flywheel 22 such that the flywheel 22 has a "KE" greater than or equal to the "KE" of the torque variance. Initially, equation (1) is used to calculate a desired moment of inertia "I" of the flywheel 22 solving for the "KE" of the torque variance created by the pressure spike $P_S$ for a given angular velocity "ω" of the flywheel 22. For example, the angular velocity "ω" of the output shaft 110 may be 152.4 radians/second with the "KE" of the torque variance created by the pressure spike $P_S$ being 12,097 N-m. Solving equation (1) provides a desired moment of inertia "I" of the flywheel 22 as 1.047 kg m².

Once the desired moment of inertia "I" of the flywheel 22 is determined, equation (2) is used to determine dimensions of the flywheel 22 using desired moment of inertia "I". As shown in FIG. 4, with the desired moment of inertia "I", a set radius of rotation "$r_1$", and a set thickness of the flywheel 22, the flywheel radius "$r_2$" and mass "m" may be manipulated such that the flywheel 22 has dimensions and a mass that are optimized for a particular application. Referring to FIG. 4, for example and not meant to be limiting, a 10 kg flywheel with an outer radius "$r_2$" of 0.45 m has the same moment of inertia as a 100 kg flywheel with an outer radius "$r_2$" of 0.13 m such that either the 10 kg flywheel or the 100 kg flywheel would have the same "KE" to absorb the "KE" of the torque variance created by the pressure spike $P_S$.

It will be appreciated that for a given system, the radius of rotation "$r_1$" of the flywheel is set by a diameter of the spindle or flange on which the flywheel is secured, e.g., upstream flange of the upstream portion 210 or the flange 242 or the spindle 244 of the downstream portion 240 (FIG. 1). In addition, the thickness "h" of the flywheel 22 may also be manipulated to vary a mass of the flywheel for a given outer radius "$r_2$".

Figure 6:
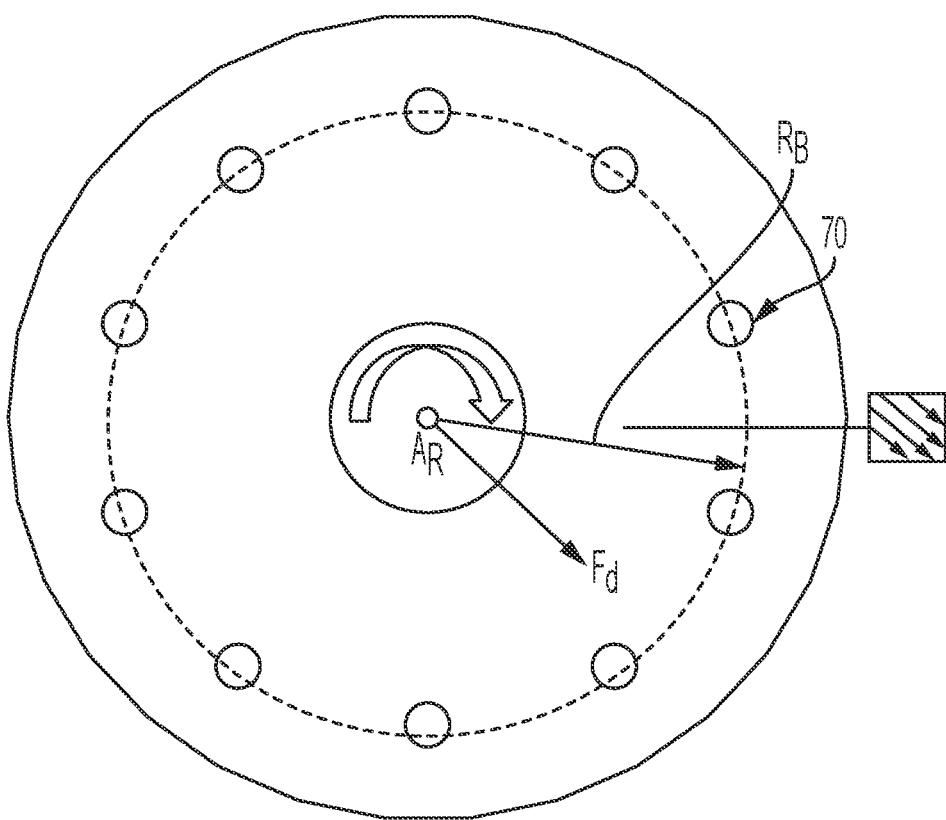
FIG. 6 is another schematic front view of a flywheel of the pump system of FIG. 1 illustrating bolt holes and rotational stresses of the flywheel according to an embodiment of the disclosure.
Figure 7:
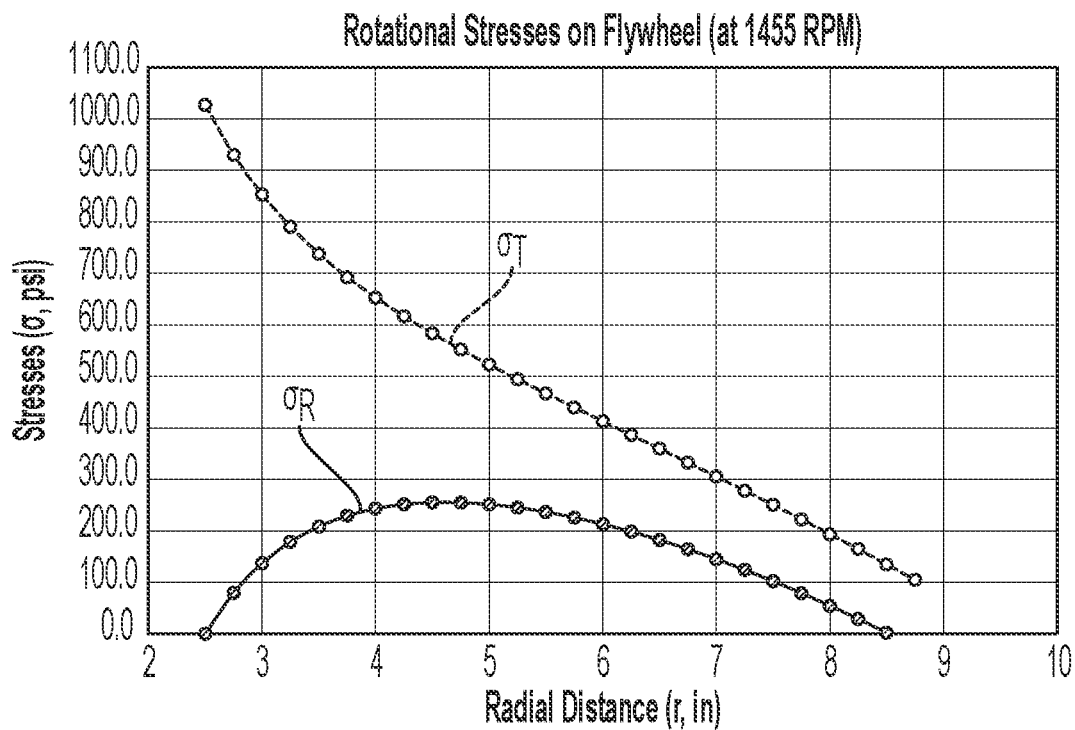
FIG. 7 is a graph illustrating tangential and radial stresses of the flywheel of FIG. 1 according to an embodiment of the disclosure.

With additional reference to FIG. 6, the flywheel 22 is subjected to rotational stresses that differ within the flywheel 22 dependent on the radial distance "$r_d$" away from axis of rotation "$A_R$" of the flywheel 22. It is important to choose a material for the flywheel 22 that is capable of withstanding the rotational stresses of the flywheel 22. To determine the rotational stresses of the flywheel 22, the flywheel may be treated as a thick-walled cylinder to calculate the tangential and radial stresses thereof. The calculations detailed below assume that the flywheel 22 has a uniform thickness "h", the flywheel radius "$r_2$" is substantially larger than the thickness "h" (e.g., $r_2 > 5h$), and the stresses are constant over the thickness "h". The tangential stress "$\sigma_t$" and radial stress "$\sigma_r$" of the flywheel 22 may be expressed as follows:

$$\sigma_t = \rho\omega^2\left(\frac{3+v}{8}\right)\left\{r_1^2 + r_2^2 + \frac{r_1^2(r_2^2)}{r_d^2} - \frac{(1+3v)}{3+v}(r_d^2)\right\} \quad (3)$$

$$\sigma_r = \rho\omega^2\left(\frac{3+v}{8}\right)\left\{r_1^2 + r_2^2 - \frac{(1+3v)}{3+v} - (r_d^2)\right\} \quad (4)$$

where $\rho$ is a mass density (lb./in³) of the material of the flywheel 22, $\omega$ is the angular velocity (rad/s) of the flywheel 22, and v is the Poisson's ratio of the flywheel 22. As shown in FIG. 7, when the inner radius $r_1$ is 2.5 inches and the outer radius $r_2$ is 8.52 inches the maximum tangential stress "$\sigma_t$" is 1027 psi at 2.5 inches from the axis of rotation and the maximum radial stress "$\sigma_r$" is 255 psi at 4.5 inches from the axis of rotation.

Figure 8:
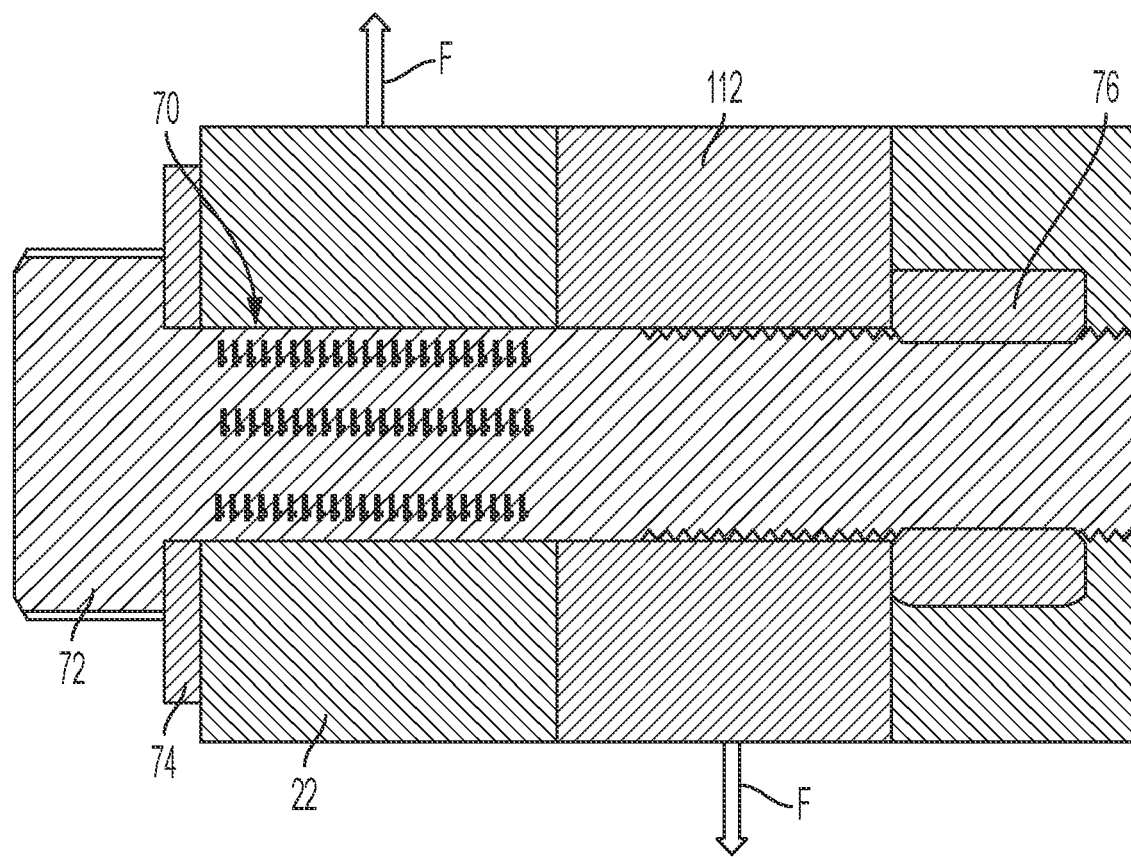
FIG. 8 is a schematic side view of a portion of the pump system of FIG. 1 illustrating a bolt and nut securing the flywheel to an output flange according to an embodiment of the disclosure.

The installation or securement of the flywheel 22 to the pump system, e.g., to output flange 112 of the output shaft 110 (FIG. 1), must also be analyzed to confirm that the means for attachment is suitable for the calculated stresses. For example, the planar stresses occurring at the point of installment may be calculated. Specifically, the flywheel 22 may be installed to the output flange 112 as described above or to the input flange of the pump as described below. For the purposes of this analysis, it will be assumed that the flywheel 22 is installed with a number of bolts 72 and nuts 76 as shown in FIG. 8. To secure the flywheel 22 to the output flange 112 (FIG. 1), each bolt 72 is passed through a bolt hole 70 defined through the flywheel 22 at a bolt radius "$r_B$" (FIG. 6) from the axis of rotation "$A_R$" of the flywheel 22. The planar stresses may be calculated as follows:

$$F_B = \frac{T}{r_B} \quad (5)$$

$$v_S = \frac{T}{A_B} \quad (6)$$

$$v_b = \frac{F_B}{hd} \quad (7)$$

where $F_B$ is a force (lbf) applied to the bolt 72, T is a torque (lb-ft) applied to the flywheel 22, $A_B$ is a bolt bearing stress area (in²) of the bolt 72, d is a diameter (ft) of the bolt hole 70, vs is a shear stress (psi) of each bolt 72, and $v_b$ is a bearing stress on the flywheel 22/bolt hole 70 (psi).

Continuing the example above, given a maximum torque "T" applied to the output flange 112 of 35,750 lb-ft with a bolt radius "$r_B$" of 7.6 inches, the force applied to the bolts $F_B$ is 56,447 lbf. With the bolt bearing area of each bolt 72 being 0.785 in² the shear stress vs of each of the 10 bolts is 7,187 psi. With the thickness of the flywheel "h" being 1.54 inches and a diameter of each bolt hole being 1.06 inches, the bearing stress $v_B$ is 3,885 psi.

From the calculated stresses of the example above and applying a factor of safety, a material for the flywheel 22 should have should have a tensile yield strength greater than or equal to 75 ksi. Examples of some suitable materials for the flywheel 22 are 1040 carbon steel, 1050 carbon steel, or Inconel® 718; however, other suitable metals or other materials may also be used. In addition, the materials sued for the bolts 72 and the nuts 76 should have a tensile strength greater than the calculated stresses. Examples of some suitable materials for the bolts 72 and the nuts 76 are Grade 8 carbon steel, Grade 5 carbon steel, or Grade G (8) steel; however, other suitable metals or other materials may also be used.

Referring briefly back to FIG. 1, the vibration dampening assembly 10 may also include at least one torsional vibration damper. The at least one torsional vibration damper may comprise a torsional vibration damper 24 disposed upstream of the pump 300. As shown, the torsional vibration damper 24 is disposed about the upstream portion 210 of the driveshaft 210 and is connected to a downstream side of the flywheel 22. The vibration damper 24 may be connected directly to the flywheel 22 or directly to the output flange 112 of the driving equipment 100 and may be disposed about the upstream portion 210 of the driveshaft 210 or the output shaft 110. The torsional vibration damper 24 is configured to prevent torsional resonance within the driving equipment 100 that may lead to damage or fatigue of components of the driving equipment 100, the driveshaft 200, or the pump 300. Incorporation of the torsional vibration damper 24 along the drivetrain in between the gearbox and/or transmission and the single acting reciprocating pump 300 allows for the vibration dampening assembly 10 to dampen the high frequency, low amplitude torsional vibrations imposed on the drivetrain system that is caused by forced excitations from the synchronous machinery. The torsional vibration damper 24 may be a viscous, a spring-viscous, or a spring torsional vibration damper. Examples of suitable torsional vibration dampers include, but are not limited to, a Geislinger Damper, a Geislinger Vdamp®, a Metaldyne Viscous Damper, a Kendrion Torsional Vibration Dampener, a Riverhawk Torsional Vibration Dampener, and the like.

As shown FIG. 1, the vibration dampening assembly 10 is secured to the output flange 112. Specifically, the flywheel 22 is connected to the output flange 112 and the torsional vibration damper 24 is connected to the flywheel 22. However, as illustrated below with reference to FIGS. 5-7, the flywheel 22 and/or the torsional vibration damper 24 may be disposed at other positions within the pump system 1 and the vibration dampening assembly 10 may include multiple flywheels and/or multiple vibration dampers.

Figure 9:
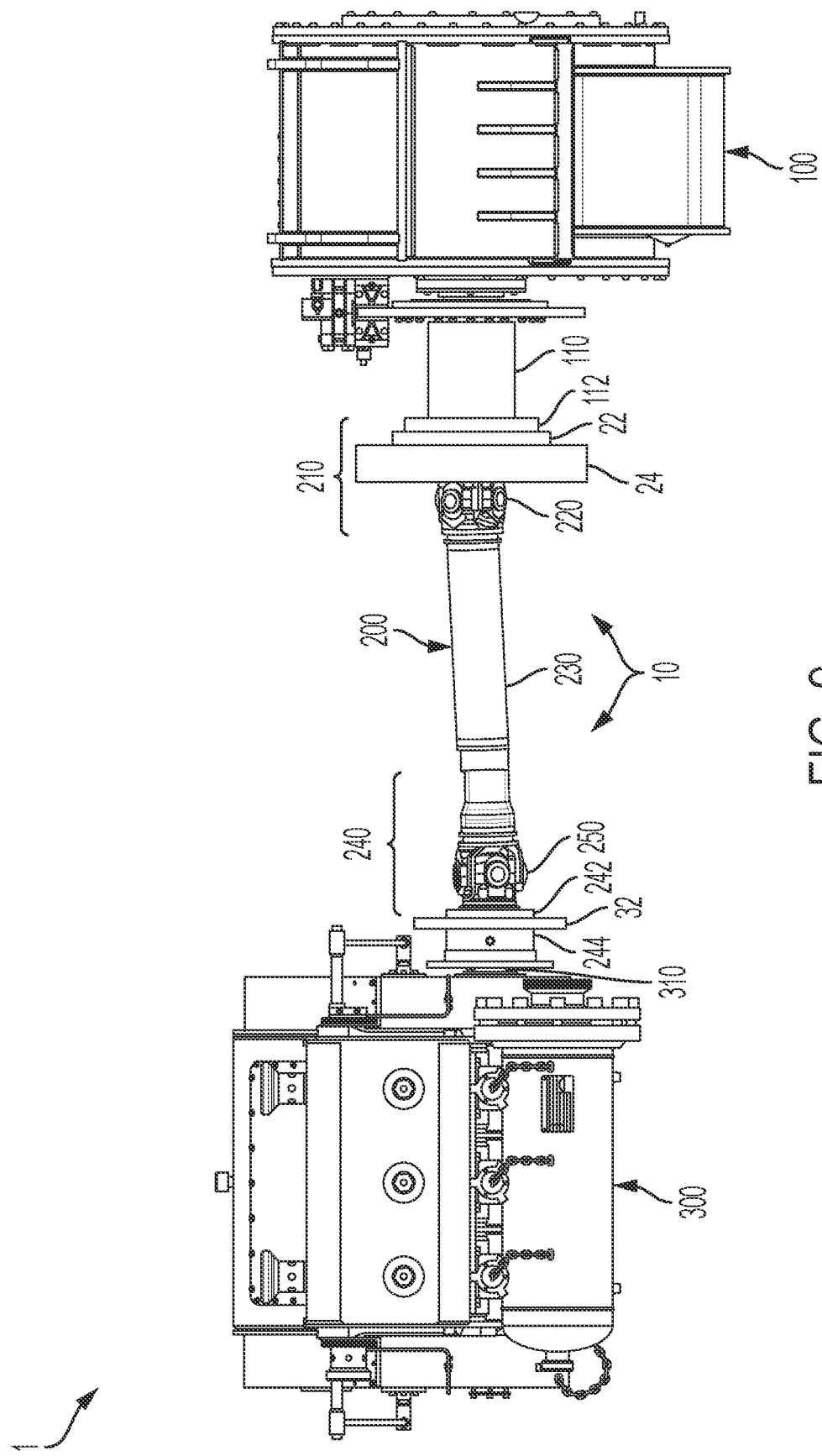
FIG. 9 is a schematic view of the pump system of FIG. 1 with another exemplary embodiment of a vibration dampening assembly according to an embodiment of the disclosure.

Referring now to FIG. 9, the vibration dampening assembly 10 includes a first flywheel 22, the torsional vibration damper 24, and a second flywheel 32. The second flywheel 32 is connected to the input flange of the pump 300. When the vibration dampening assembly 10 includes the first flywheel 22 and the second flywheel 32, the sum of the "KE" of the flywheels 22, 32 may be configured in a manner similar to the "KE" of a single flywheel as detailed above with respect to the flywheel 22. In some embodiments, each of the first and second flywheel 22, 32 is sized to have a similar moment of inertia "I". In such embodiments, the first and second flywheel 22, 32 may have similar dimensions and mass or may have different dimensions and mass while having a similar moment of inertia "I". In other embodiments, the first flywheel 22 is configured to have a moment of inertia "I" different, e.g., greater than or lesser than, a moment of inertia "I" of the second flywheel 32.

Figure 10:
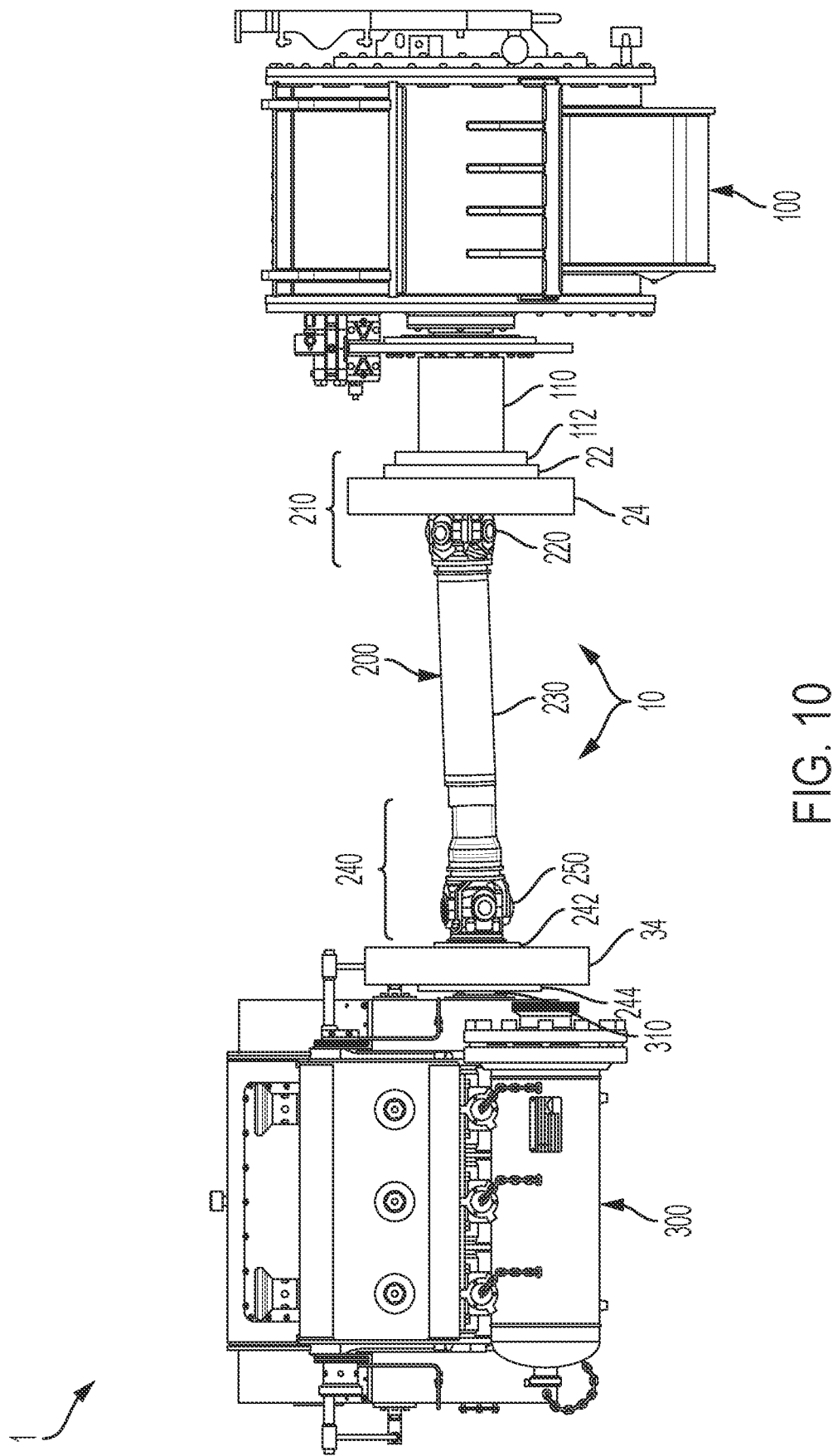
FIG. 10 is a schematic view of the pump system of FIG. 1 with another exemplary embodiment of a vibration dampening assembly according to an embodiment of the disclosure.

With reference to FIG. 10, the vibration dampening assembly 10 includes the flywheel 22, a first torsional vibration damper 24, and a second vibration damper 34. The flywheel 22 is connected to the output flange 112 of the driving equipment 100 and the first torsional vibration damper 24 is connected to the flywheel 22. The second vibration damper 34 is connected to the input flange of the pump 300. Using first and second vibration dampers 24, 34 instead of a single vibration damper may allow for greater resistance to torsional resonance within the driving equipment 100 and/or for each of the first and second vibration dampers 24, 34 to have a reduced size compared to a single vibration damper.

Figure 11:
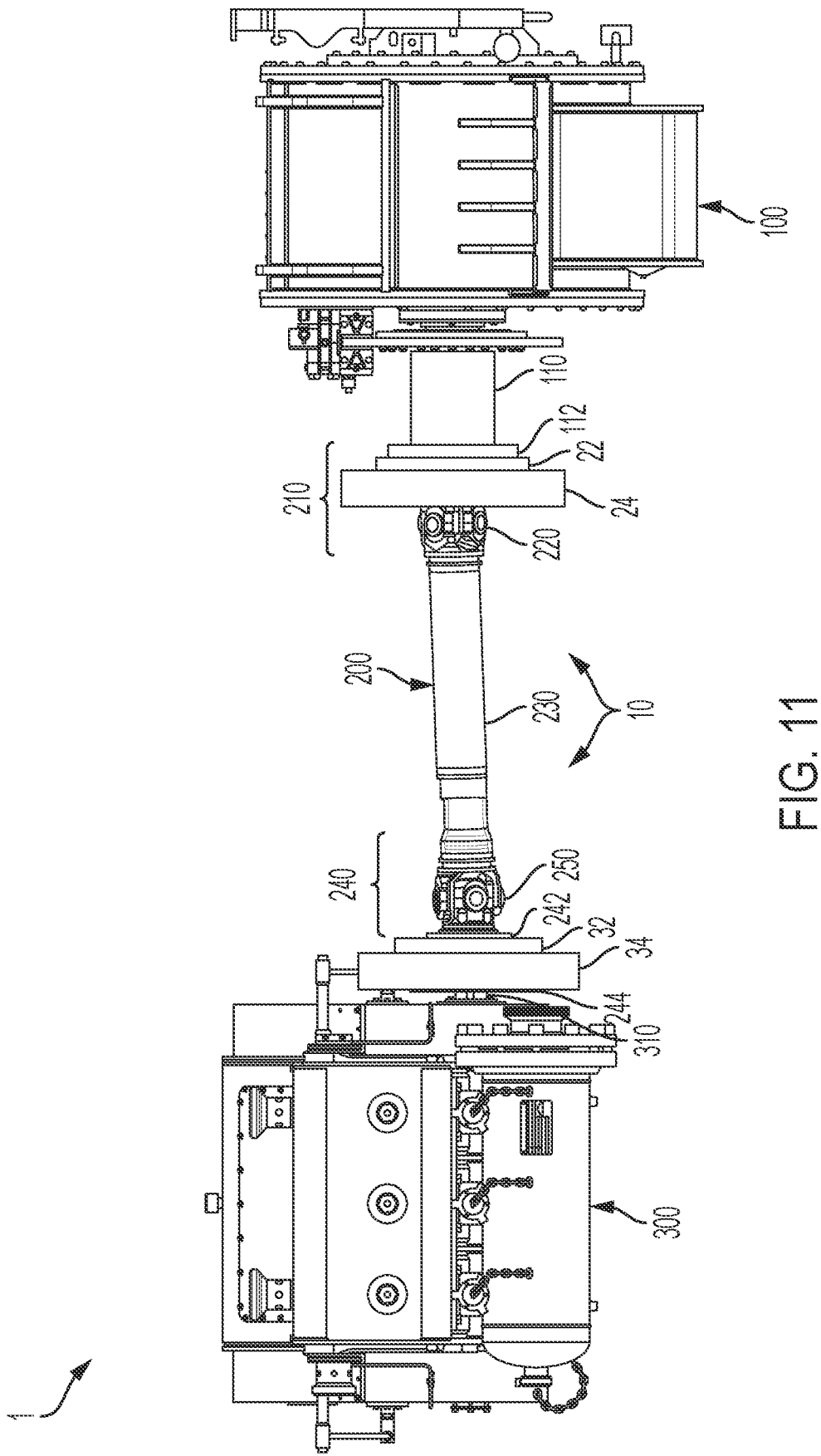
FIG. 11 is a schematic view of the pump system of FIG. 1 with another exemplary embodiment of a vibration dampening assembly according to an embodiment of the disclosure.

Referring now to FIG. 11, the vibration dampening assembly 10 includes the first flywheel 22, the first torsional vibration damper 24, the second flywheel 32, and the second vibration damper 34. The first flywheel 22 is connected to the output flange 122 of the driving equipment 100 with the first torsional vibration damper 24 connected to the first flywheel 22. The second flywheel 32 is connected to the input flange of the pump 300 with the second torsional vibration damper 34 connected to the second flywheel 32. As noted above, the first and second flywheels 22, 32 may be sized such that the sum of the "KE" of the flywheels 22, 32 is configured in a manner similar to the "KE" of a single flywheel detailed above with respect to the flywheel 22. In addition, using first and second vibration dampers 24, 34 instead of a single vibration damper which may allow for greater resistance to torsional resonance within the driving equipment 100.

The configurations of the vibration dampening assembly 10 detailed above should be seen as exemplary and not exhaustive of all the configurations of the vibration dampening assembly 10. For example, the vibration dampening assembly 10 may consist of a flywheel 32 and a torsional vibration damper 34 as shown in FIG. 6. In addition, it is contemplated that the vibration dampening assembly 10 may include more than two flywheels or more than two torsional vibration dampers. Further, the vibration dampers may each be connected directly to a respective flange, e.g., output flange 112 or input flange, and not be directly connected to a flywheel, e.g., flywheels 22, 32.

Figure 12:
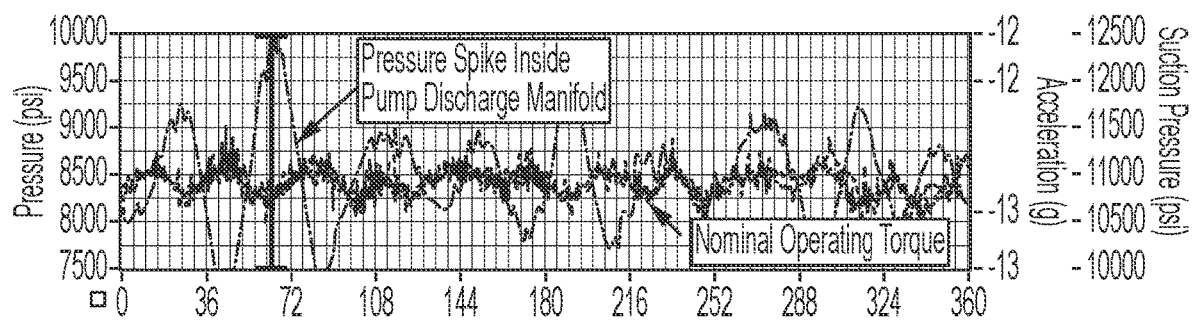
FIG. 12 is a graph showing torsional vibration analysis data results demonstrating the reduction in synthesis and torque spikes with the use of a torsional vibration dampener (TVD) and a single mass produced by a pump system such as shown in FIG. 1 according to an embodiment of the disclosure.

FIG. 12 is a graph showing torsional vibration analysis data results demonstrating the reduction in synthesis and torque spikes with the use of a torsional vibration dampener (TVD) and a single mass produced by a pump system such as shown in FIG. 1 according to an embodiment of the disclosure. A significant reduction in amplitude and frequency of the system torque spikes is noticeable over entire speed range of the reciprocating pump.

This is a continuation of U.S. Non-Provisional application Ser. No. 17/585,766, filed Jan. 27, 2022, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," which is a continuation of U.S. Non-Provisional application Ser. No. 17/469,970, filed Sep. 9, 2021, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,280, 331, issued Mar. 22, 2022, which is a continuation of U.S. Non-Provisional application Ser. No. 17/363,151, filed Jun. 30, 2021, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,149, 726, issued Oct. 19, 2021, which is a continuation of U.S. Non-Provisional application Ser. No. 17/213,562, filed Mar. 26, 2021, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,092, 152, issued Aug. 17, 2021, which is a continuation of U.S. Non-Provisional application Ser. No. 16/948,291, filed Sep. 11, 2020, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,015, 594, issued May 25, 2021, which claims priority to and the benefit of U.S. Provisional Application No. 62/704,560, filed May 15, 2020, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," and U.S. Provisional Application No. 62/899,963, filed Sep. 13, 2019, titled "USE OF SINGLE MASS FLYWHEEL ALONGSIDE TORSIONAL VIBRATION DAMPER SYSTEM FOR SINGLE ACTING RECIPROCATING PUMP," the disclosures of which are incorporated herein by reference in their entireties.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A method of use of a vibration dampening assembly for a pump system, the pump system including one or more pumps and drive equipment to drive the one or more pumps, the vibration dampening assembly including one or more torsional vibration dampers, the method comprising:
    positioning the one or more torsional vibration dampers of the vibration dampening assembly in one or more locations to reduce torsional resonance within one or more of: (a) the drive equipment for one or more pumps of the pump system, or (b) the one or more pumps of the pump system, the one or more torsional vibration dampers including a first torsional vibration damper operably connected to an output drive shaft and a second torsional vibration damper operably connected to an input drive shaft of the pump system; and
    rotating one or more flywheels operably connected to the input drive shaft of the pump system, the one or more flywheels configured to rotate with the input drive shaft, thereby to absorb a torque shock as defined by torque variance within the one or more pumps of the pump system.

2. The method as defined in claim 1, wherein the one or more pumps includes a reciprocating pump, and wherein the one or more flywheels includes a single mass flywheel.

3. A method of use of one or more vibration dampeners for a pump system, the pump system includes one or more pumps and drive equipment to drive the one or more pumps, the method comprising:
    positioning the one or more vibration dampers to reduce torsional resonance within one or more of: (a) the drive equipment of the pump system, or (b) the one or more pumps of the pump system, the positioning including positioning one or more vibration dampers operably to connect to an output drive shaft of the drive equipment and positioning one or more vibration dampers operably to connect to an input drive shaft of the one or more pumps; and rotating one or more flywheels operably connected to the input drive shaft of the one or more pumps of the pump system, the one or more flywheels configured to rotate with the input drive shaft, thereby to absorb a torque shock within the one or more pumps of the pump system.

4. The method as defined in claim 3, wherein the one or more pumps includes a reciprocating pump, and wherein the one or more flywheels includes a single mass flywheel.

5. The method as defined in claim 3, wherein the one or more vibration dampers includes a first torsional vibration damper and a second torsional vibration damper, and wherein the first torsional vibration damper operably is connected to the output shaft of the drive equipment and the second torsional vibration damper operably is connected to the input shaft of the one or more pumps.

6. A method of use of one or more vibration dampeners for a pump system, the pump system includes one or more pumps and drive equipment to drive the one or more pumps via a driveshaft of the drive equipment, the method comprising:

positioning the one or more vibration dampers to reduce resonance within one or more of: (a) the drive equipment of the pump system, or (b) the one or more pumps of the pump system, the positioning including positioning one or more vibration dampers operably to connect to the drive equipment and positioning one or more vibration dampers operably to connect to or adjacent the one or more pumps; and rotating one or more flywheels operably connected to or adjacent the one or more pumps of the pump system, thereby to absorb a torque shock within the one or more pumps of the pump system, wherein a flywheel of the one or more flywheels is positioned between an input shaft of the one or more pumps and a driven end of the driveshaft.

7. The method as defined in claim 6, wherein the one or more pumps includes a reciprocating pump, and wherein the one or more flywheels includes a single mass flywheel.

8. The method as defined in claim 7, wherein the one or more vibration dampers includes a first torsional vibration damper and a second torsional vibration damper, and wherein the first torsional vibration damper operably is connected to an output shaft of the drive equipment and the second torsional vibration damper operably is connected to an input shaft of the one or more pumps.

9. The method as defined in claim 6, wherein a second flywheel of the one or more flywheels is positioned between an output shaft of the drive equipment and a driving end of the driveshaft.

10. A method of manufacturing one or more flywheels for a vibration assembly of a pump system having one or more reciprocating pumps and associated drive equipment to drive the one or more pumps, the method comprising:

determining, via one or more controllers, a desired moment of inertia of the one or more flywheels from kinetic energy of a torque variance within the pump system above a nominal torque of the pump system resulting from fluid pulsation within the one or more pumps, the determining of the desired moment of inertia of the one or more flywheels including:

determining a first desired moment of inertia of a first flywheel from a first portion of the kinetic energy of the torque variance within the pump system as a result of fluid pulsation within the one or more pumps, and determining a second desired moment of inertia of a second flywheel from a second portion of the kinetic energy of the torque variance within the pump system as a result of fluid pulsation within the one or more pumps;

determining, via the one or more controllers, one or more of a first flywheel rotational stress associated with the first flywheel or a second flywheel rotational stress associated with the second flywheel, the one or more of the first flywheel rotational stress or the second flywheel rotational stress includes one or more of: (a) a first radial stress and a first tangential stress associated with the first flywheel, or (b) a second radial stress and a second tangential stress associated with the second flywheel;

sizing the one or more flywheels to have the desired moment of inertia from the determined desired moment of inertia and the determined rotational stress, the sizing the one or more flywheels including sizing the first flywheel to have the first desired moment of inertia and sizing the second flywheel to have the second desired moment of inertia; and producing the one or more flywheels for the pump system based on the sizing of the one or more flywheels.

11. The method as defined in claim 10, wherein sizing the flywheel comprises one or more of:

determining, via the one or more controllers, a first mass of the first flywheel based at least in part on the first desired moment of inertia, or determining, via the one or more controllers, a second mass of the second flywheel based at least in part on the second desired moment of inertia.

12. The method as defined in claim 10, further comprising determining, via the one or more controllers and based at least in part on one or more of the first mass of the first flywheel or the second mass of the second flywheel, one or more of:

one or more of a first radius of rotation of the first flywheel or a first thickness of the first flywheel, or one or more of a second radius of rotation of the second flywheel or a second thickness of the second flywheel.

13. The method as defined in claim 10, further comprising determining, via the one or more controllers, one or more of:

the first portion of the kinetic energy of the torque variance within the pump system, or the second portion of the kinetic energy of the torque variance within the pump system.

14. The method as defined in claim 13, wherein the one or more of the first portion of the kinetic energy of the torque variance within the pump system or the second portion of the kinetic energy of the torque variance is determined based at least in part on empirical data associated with previous operations of the pump system.

15. The method as defined in claim 14, wherein the empirical data comprises one or more of a magnitude of pressure spikes or a duration of pressure spikes occurring during the previous operations of the pump.

16. The method as defined in claim 10, wherein one or more of the first portion of the kinetic energy of the torque variance within the pump system or the second portion of the kinetic energy of the torque variance is determined based at least in part on one or more of a first angular velocity of operation of the pump or a second angular velocity of operation of the pump.

\* \* \* \* \*